(12) United States Patent
Berthelsen

(10) Patent No.: US 11,713,196 B1
(45) Date of Patent: Aug. 1, 2023

(54) STRUCTURE AND METHOD FOR MOUNTING A CONVEYOR DRIVE SYSTEM INSIDE A LOAD HOLDING COMPARTMENT

(71) Applicant: Hallco Industries, Inc., Tillamook, OR (US)

(72) Inventor: Timothy M. Berthelsen, Tillamook, OR (US)

(73) Assignee: Hallco Industries, Inc., Tillamook, OR (US)

(*) Notice: Subject to any disclaimer, the term of this patent is extended or adjusted under 35 U.S.C. 154(b) by 0 days.

(21) Appl. No.: 17/233,485

(22) Filed: Apr. 17, 2021

Related U.S. Application Data

(60) Provisional application No. 63/011,516, filed on Apr. 17, 2020.

(51) Int. Cl.
*B65G 25/06* (2006.01)
*B65G 41/00* (2006.01)

(52) U.S. Cl.
CPC ......... *B65G 25/065* (2013.01); *B65G 41/006* (2013.01); *B65G 2812/12* (2013.01)

(58) Field of Classification Search
CPC   B65G 25/065; B65G 41/006; B65G 2812/09; B65G 2812/12
See application file for complete search history.

(56) References Cited

U.S. PATENT DOCUMENTS

| | | | |
|---|---|---|---|
| 3,231,111 A | 1/1966 | Clar | |
| 3,643,824 A | 2/1972 | Partridge | |
| 3,955,694 A | 5/1976 | Herpich | |
| 4,184,587 A | 1/1980 | Hallstrom | |
| 4,221,527 A | 9/1980 | Morrison | |
| 5,125,502 A * | 6/1992 | Foster | B65G 25/065 198/750.3 |
| 5,332,081 A * | 7/1994 | Quaeck | B65G 25/065 198/750.6 |
| 5,402,878 A * | 4/1995 | Lutz | B65G 25/065 198/750.6 |
| 5,522,494 A | 6/1996 | Lutz | |
| 5,605,221 A * | 2/1997 | Foster | B65G 25/065 198/750.5 |
| 6,146,078 A | 11/2000 | Hamill et al. | |
| 6,497,547 B1 | 12/2002 | Maglaras | |
| 6,513,648 B1 * | 2/2003 | Hallstrom | B65G 25/065 198/750.2 |
| 8,123,454 B2 | 2/2012 | Halstrom | |
| 8,616,365 B2 | 12/2013 | Berthelsen et al. | |
| 8,827,624 B2 | 9/2014 | Halstrom | |
| 9,452,889 B2 | 9/2016 | Berthelsen et al. | |
| 10,059,527 B1 | 8/2018 | Berthelsen | |

\* cited by examiner

*Primary Examiner* — Gene O Crawford
*Assistant Examiner* — Keith R Campbell
(74) *Attorney, Agent, or Firm* — Law Office of Karen Dana Oster, LLC

(57) ABSTRACT

A conveyor drive system for installation in a load-holding compartment, the load-holding compartment having a compartment floor having a top surface, the conveyor drive system includes a linear actuator, a framework, and at least one linear-actuator-to-slat connector.

7 Claims, 22 Drawing Sheets

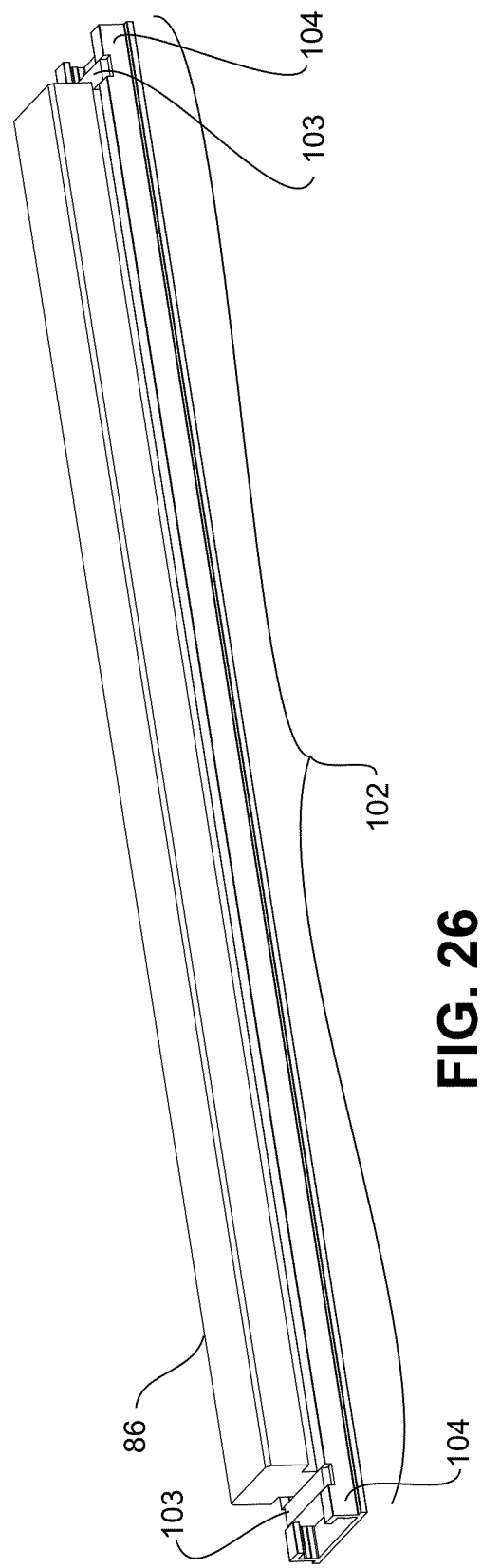

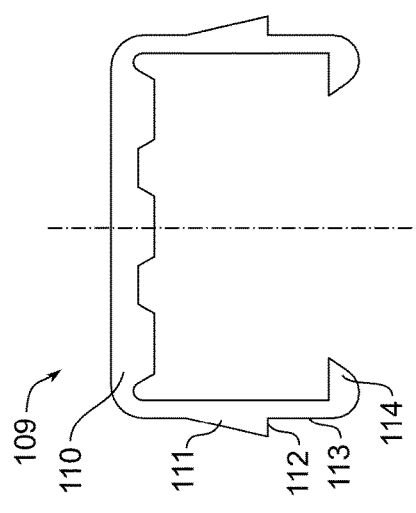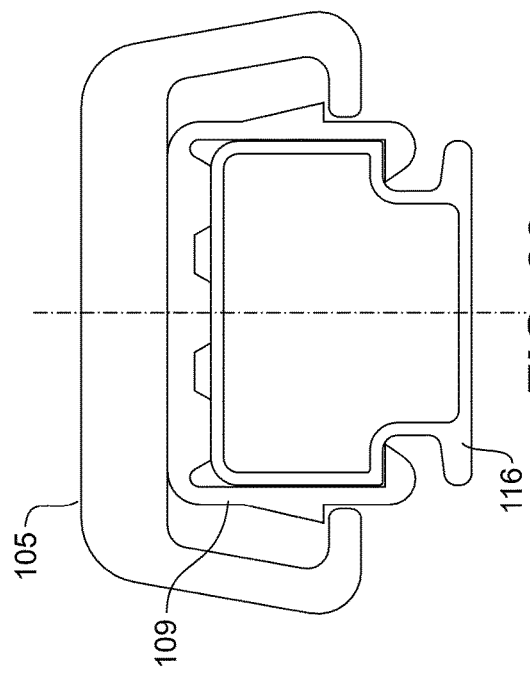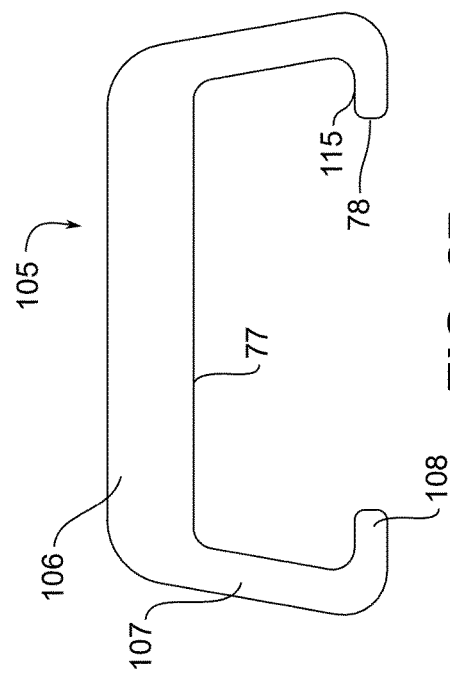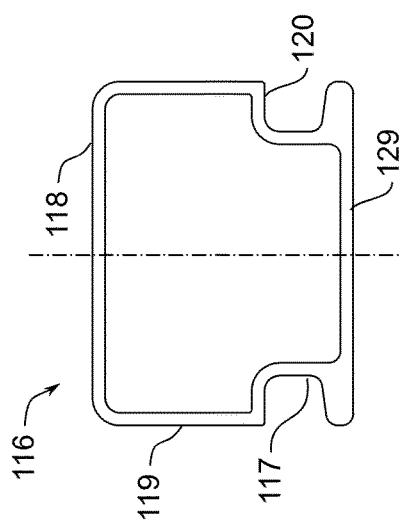

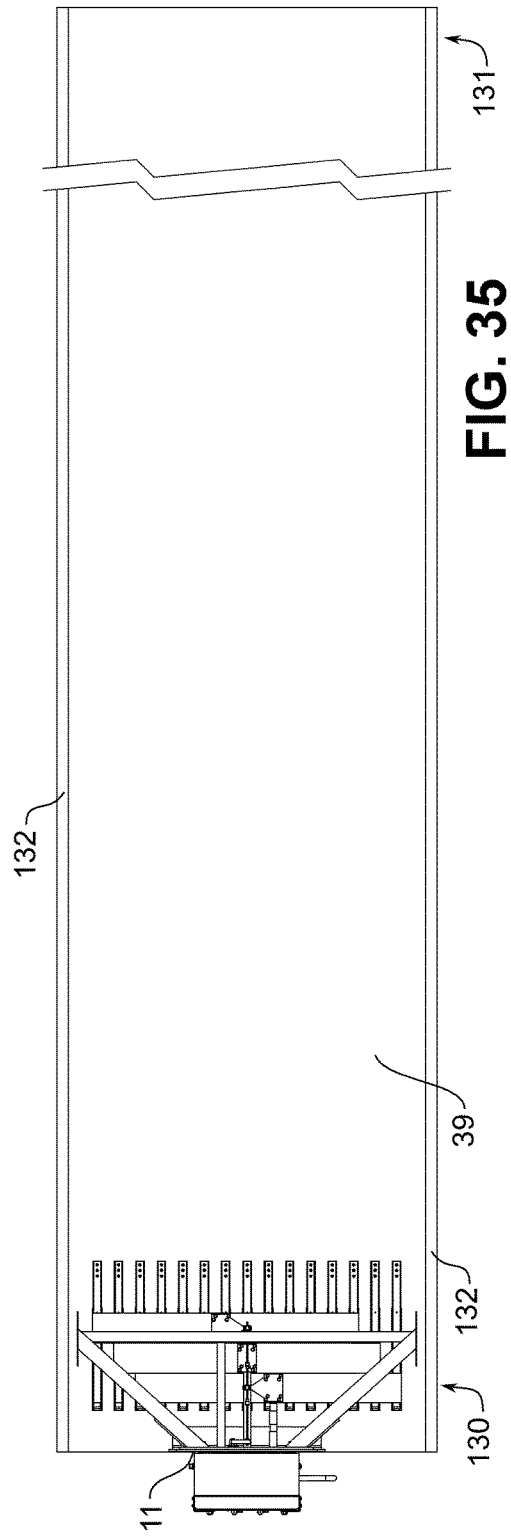
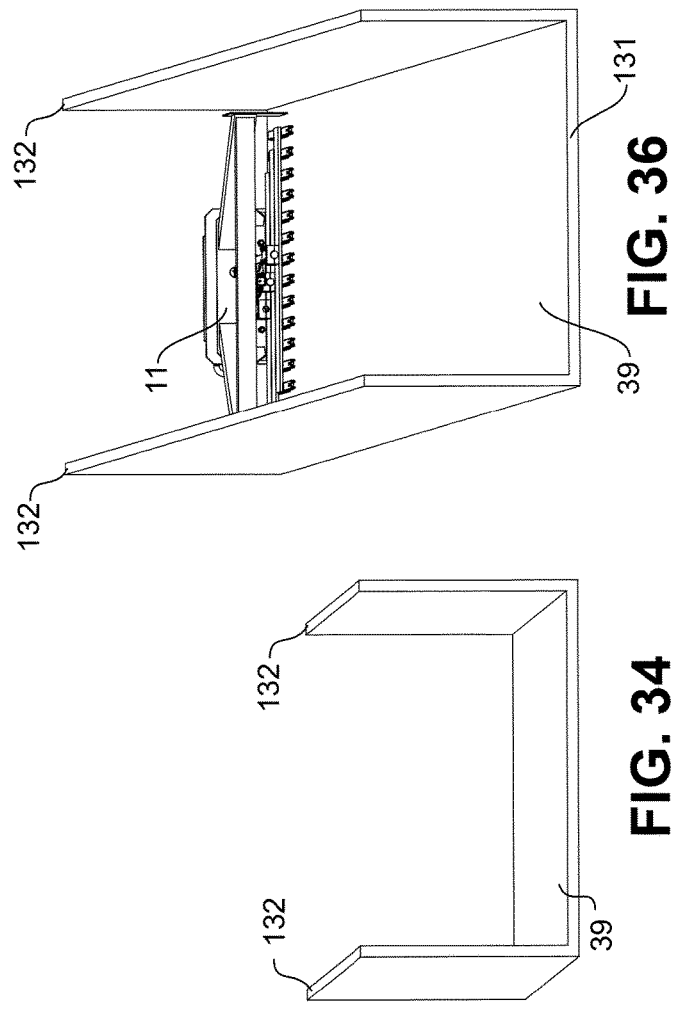

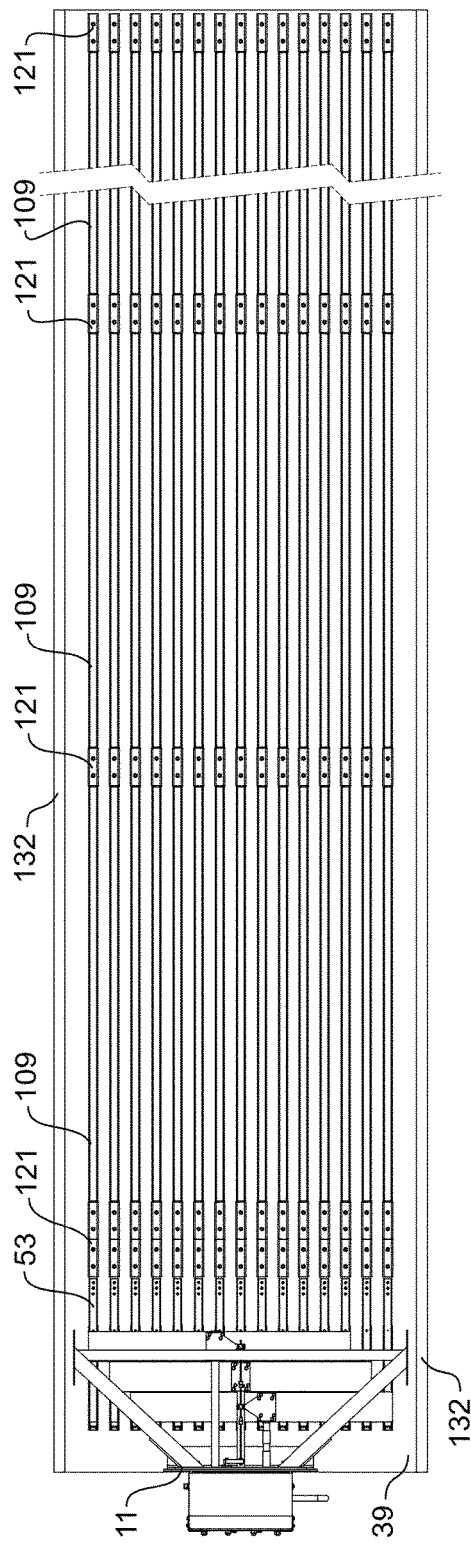
FIG. 38
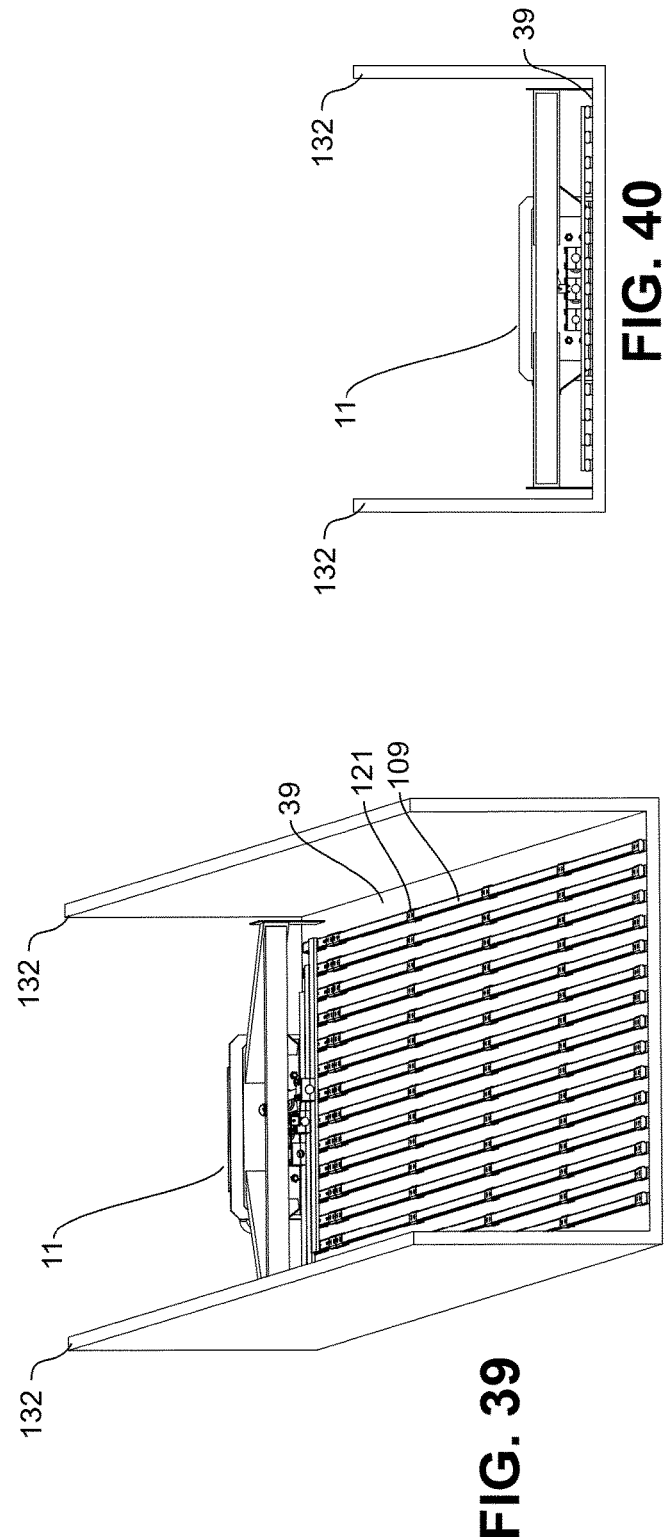
FIG. 40
FIG. 39

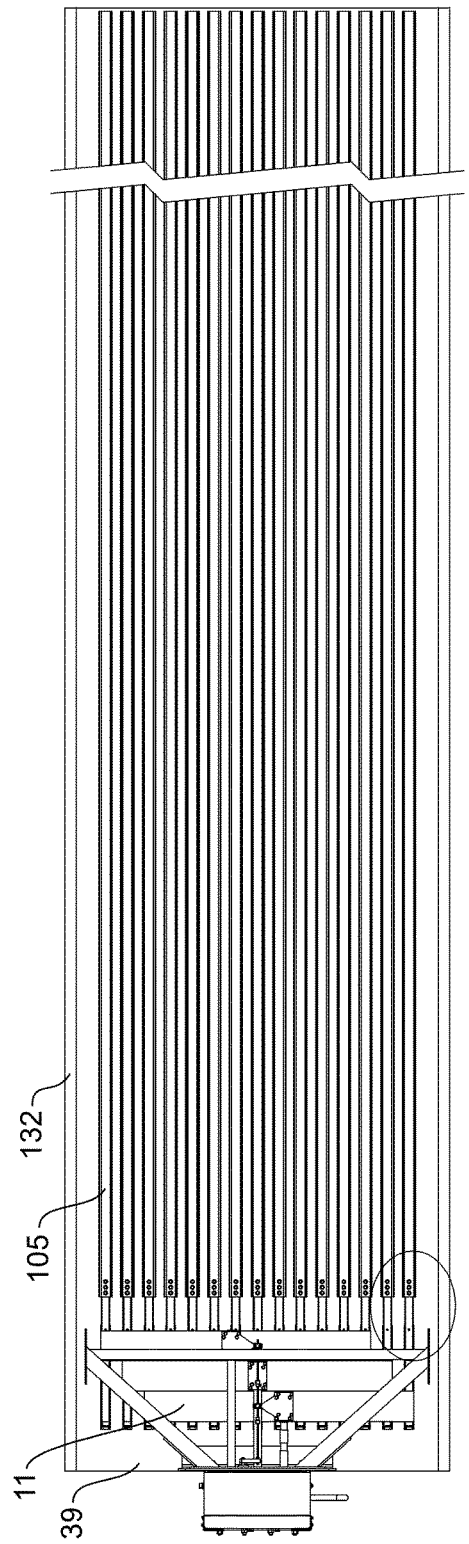
FIG. 41
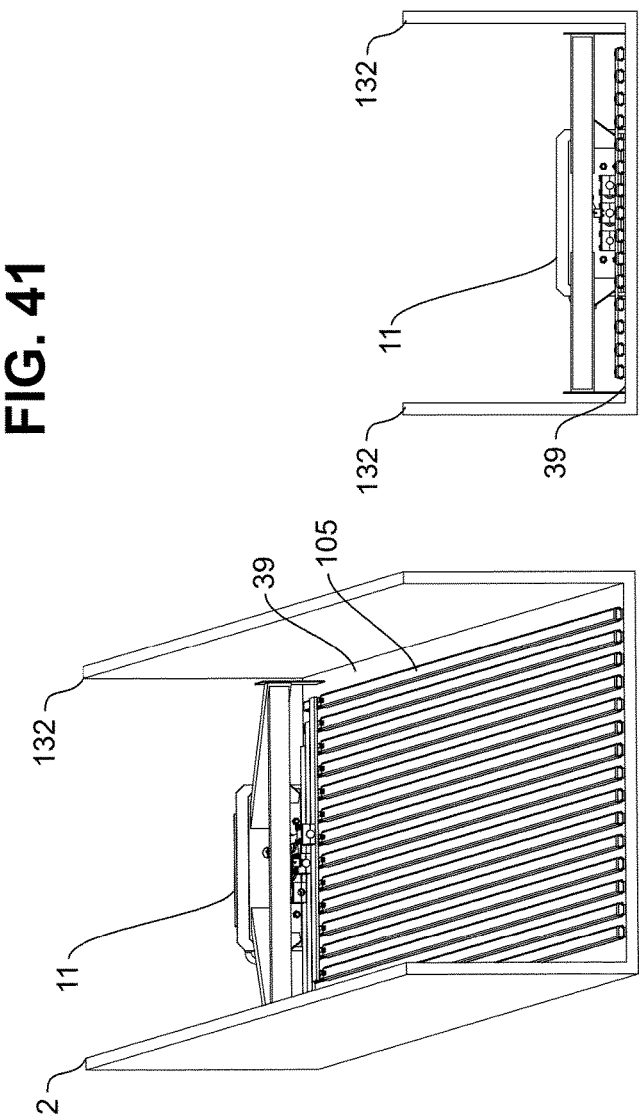
FIG. 44
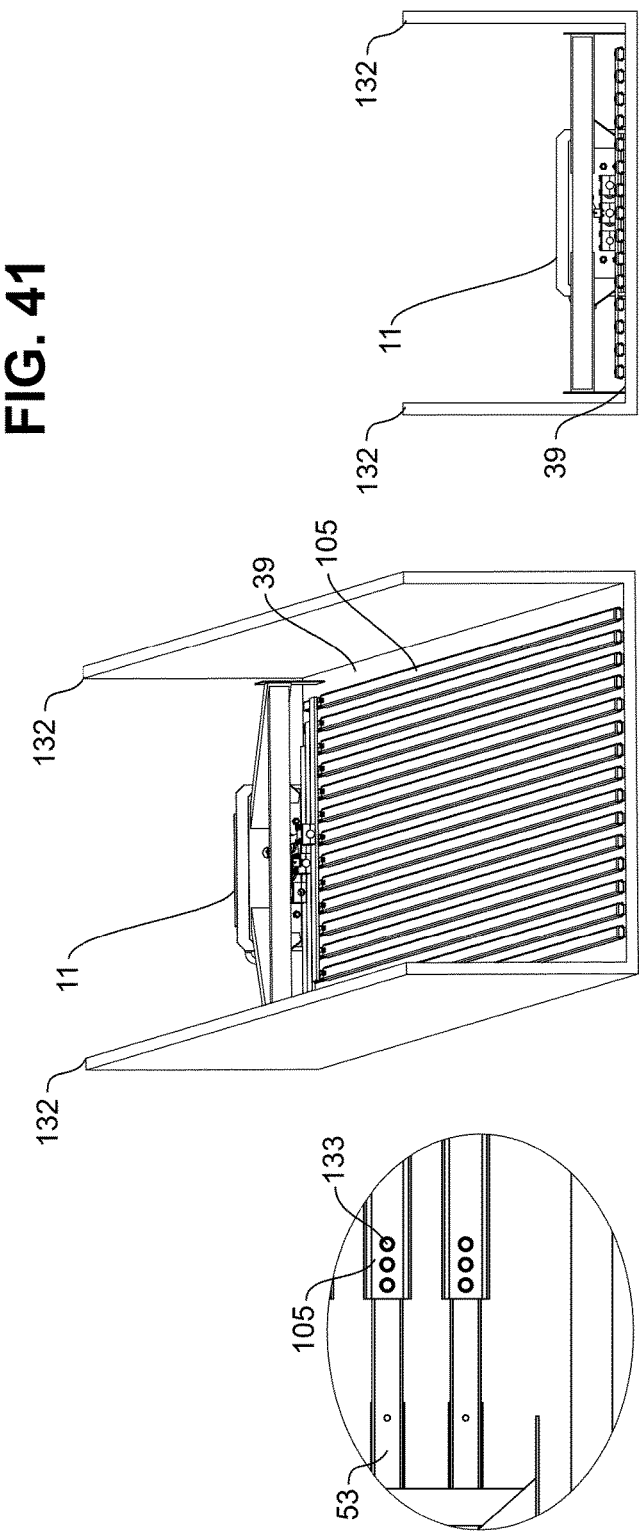
FIG. 43
FIG. 42

STRUCTURE AND METHOD FOR MOUNTING A CONVEYOR DRIVE SYSTEM INSIDE A LOAD HOLDING COMPARTMENT

The present application is an application claiming the benefit of U.S. Provisional Patent Application No. 63/011,516, filed Apr. 17, 2020. The present application is based on and claims priority from this application, the disclosure of which is hereby expressly incorporated herein by reference in its entirety.

TECHNICAL FIELD

Described herein are a structure and method for mounting a conveyor drive system inside a load-holding compartment.

BACKGROUND

There are a number of known solutions for moving a load out of a compartment. These solutions include the "reciprocating slat" type conveyor assemblies for use in load-holding compartments for conveying load materials, such as, without limitation, aggregates, biomass, agriculture products, construction debris, municipal solid waste, recyclable materials. These solutions have the following components in common: 1. linear actuators; 2. moving slats; 3. crossdrives attaching the slats to the linear actuators; and 4. framework to attach the linear actuators to the load-holding compartment frame and/or walls.

A reciprocating slat conveyor drive system consists of long slats/boards that span the entire length of the load-holding compartment (also referred to as a "bin") in which the conveyor is installed. Many of these slats are laid side by side across the width of the bin so they form a floor for the bin. They are then moved back and forth along the length of the bin by means of hydraulic cylinders or other type of linear actuators. If all of the slats are moved together, the load sitting on top of the slats will also be moved because the load is stuck (remains in place) to the moving slats by friction. However, if only one or just a few of the slats are moved, the load will not be moved (it remains in place). This is because the load is stuck (remains in place) to the many more other slats that are not moving. The load can be moved in steps out of the bin in two phases: the first phase is simultaneously moving all of the slats one way a for short distance, and the second phase is then holding most of the slats stationary while retracting a few at a time, until all of the slats are returned to their original position. Examples of this reciprocating slat conveyor systems are described, for example, in U.S. Pat. No. 4,184,587 to Hallstrom, U.S. Pat. No. 8,123,454 to Hallstrom, U.S. Pat. No. 8,616,365 to Berthelsen et al., U.S. Pat. No. 8,827,624 to Hallstrom, U.S. Pat. No. 9,452,889 to Berthelsen et al., and U.S. Pat. No. 10,059,527 to Berthelsen (which are referred to jointly herein as the "Hallco Patents").

Slats and the slat guiding components are fairly simple to design. The more difficult portion of a reciprocating slat conveyor design is the part of the conveyor that moves the slats, i.e. the actuator. There have been many different designs of actuators. Simplistically, for known exemplary actuators, the moving end of an actuator pushes a slat in one direction while, at the same time, the stationary end of the actuator pushes against whatever structure the other end of the actuator is attached to. The design of this stationary end attachment is not trivial. If the stationary end is attached to something that is flexible or easier to move than the slat, the stationary end will move instead of the slat. Since the purpose of the conveyor is to move the load and not the stationary end of the actuator, the stationary end will preferably be attached to something relatively rigid. For this reason, many design variations have been created in an effort to keep the stationary end of the actuator from moving.

For example, a common design for attaching the stationary end of the actuator is to place the actuator below the slats near the center of the width of the floor. A frame is then constructed out of metal to span the distance between the stationary end and some large beams that extend under the length of the bin. Since there are many different bin designs and the location and size of the large beams is different for each, either the bins have to be changed to fit the actuator attachment frame or the actuator attachment frame must be changed to fit each of the bin beam variations. Neither option is ideal because the manufacturer, in either case, is required to expend additional effort.

Another example of a common design for attaching the stationary end of the actuator is to place the actuator at the same level or above the slats near the center of the width of the floor. In these cases, the actuator is positioned at the "front end" of the slats. The front end of the slats is positioned in the "front end" of the bin. The "front end" of the bin is opposite the "back end" of the bin (the back end being the bin end from which the load falls or exits). This location is the only one possible because any other location would put the actuator in the pathway of the load, which would prevent the load from moving. In all of the current actuator designs using this location, the actuator attachment frame has been made an integral part of the bin frame structure. This is because the actuator produces large forces and bending moments in the process of moving the slats and the easiest place to support those forces and moments are through the frame of the bin. Hence, in these cases, either the bin manufacturer extensively modifies the front framing of their bin to provide a place for the actuator to attach or the conveyor manufacturer constructs the front frame of the bin including the conveyor actuator based on which the bin manufacturer constructs the bin.

Part of the difficulty of the design of the stationary end attachment is that the stationary end experiences forces in more directions than in line with the slats. This is because it is not very efficient to place the actuator in perfect alignment with the slats. This misalignment causes bending forces and off-center forces. This is why conveyor manufacturers have relied on a heavy, strong framework that is part of or built up from the frame of the bin. The frame of the bin under the floor and the frame making up the front wall of the bin are all designed to support the load. Therefore, they are strong enough to support the actuator off-center and bending forces. The problem with this method is that there are many different bin designs and the location and size of the frame under the floor and the frame of the front wall are different for each. In order to adequately support the stationary end of the actuator, either the bins have to be changed to fit the actuator attachment or the actuator attachment must be changed to fit each of the bin frame variations. Neither option is ideal because extra effort must be expended by one or the other manufacturer. Custom design like this becomes more difficult if it is desired to convey a high liquid content load without leakage of the liquid out of the bin. The reason for this is that the actuator support framework extends through the floor and/or the walls of the container to attach to the frame of the bin. This means that in order to seal the bin, the floor, and walls must be built around the framework creating more joints and thus more places for failure.

Since the actuator attachment frame is an integral part of the frame of the bin, the actuators and all of the components attached to them must be shipped from the conveyor manufacturer in many pieces. They cannot be factory assembled. The bin manufacturer must assemble each to the bin frame in the proper order and alignment to obtain the proper function. Each assembly step increases the likelihood of errors leading to failure of the product.

SUMMARY

A conveyor drive system for installation in a load-holding compartment, the load-holding compartment having a compartment floor having a top surface, the conveyor drive system includes a linear actuator, a framework, and at least one linear-actuator-to-slat connector. The linear actuator has at least one stationary component and a plurality of moving components. The framework is for attaching the at least one stationary component to the top surface of the compartment floor. Each linear-actuator-to-slat connector is preferably attached to at least one moving component, the moving components attached to a particular linear-actuator-to-slat connector moving simultaneously in relation to the movement of the particular linear-actuator-to-slat connector. The interconnection of the plurality of linear actuators, the framework, and the at least one linear-actuator-to-slat connector allowing the conveyor drive system to be handled as a unitary component.

One preferred linear actuator has a stationary end associated with the at least one stationary component. One preferred linear actuator having a stationary end associated with the at least one stationary component, an at least partially enclosed compartment covering the stationary end.

The plurality of moving components may be a plurality of slats.

Each linear-actuator-to-slat connector may be attached to at least one moving component from each linear actuator.

The framework preferably distributes at least the majority (or all) of the actuator forces produced by the linear actuator over multiple points that are spread apart on the top surface of the compartment floor of the load-holding compartment.

The conveyor drive system preferably includes a first angled sub-frame member, a second angled sub-frame member, a spanning sub-frame member, a first side wall, and a second side wall. The first end of the first angled sub-frame member is preferably associated with the at least one stationary component of the linear actuator, and the second end of the first angled sub-frame member is preferably associated with the first side wall. The first end of the second angled sub-frame member is preferably associated with the at least one stationary component of the linear actuator, and the second end of the second angled sub-frame member is preferably associated with the second side wall. The first end of the spanning sub-frame member is preferably associated with the first side wall, and the second end of the spanning sub-frame member is preferably associated with the second side wall. Each side wall preferably has a lower edge associatable with the top surface of the compartment floor of the load-holding compartment.

Objectives, features, combinations, and advantages described and implied herein will be more readily understood upon consideration of the following detailed description of the invention, taken in conjunction with the accompanying drawings. The subject matter described herein is also particularly pointed out and distinctly claimed in the concluding portion of this specification.

DESCRIPTION OF THE DRAWINGS

The accompanying drawings illustrate various exemplary structures and methods for mounting a conveyor drive system inside a load-holding compartment, components, and/or provide teachings by which the various exemplary structure and method for mounting a conveyor drive system inside a load-holding compartment are more readily understood.

FIG. 26 is a perspective view of an exemplary assembly of the shallow C shaped profile, the figure-eight shaped block, and the rectangular blocks.

FIG. 27 is a cross-section view of an exemplary slat.

FIG. 28 is a cross-section view of an exemplary slat guide bearing.

FIG. 29 is a cross-section view of an exemplary slat guide.

FIG. 30 is a cross-section view showing how the exemplary slat, guide bearing, and slat guide fit together.

FIG. 34 is a perspective view of an exemplary load-holding compartment or bin.

FIG. 35 is a top view showing an exemplary actuator structure placed into and positioned in a bin.

FIG. 36 is a perspective view showing the exemplary actuator structure placed into and positioned in the exemplary bin.

FIG. 37 is a back end view showing the exemplary actuator structure placed into and positioned in the exemplary bin.

FIG. 38 is a top view showing the exemplary actuator structure, the exemplary slat guides, and the exemplary bearings placed into and positioned in the exemplary bin.

FIG. 39 is a perspective view showing the exemplary actuator structure, the exemplary slat guides, and the exemplary bearings placed into and positioned in the exemplary bin.

FIG. 40 is a back end view showing the exemplary actuator structure, the exemplary slat guides, and the exemplary bearings placed into and positioned in the exemplary bin.

FIG. 41 is a top view showing the exemplary actuator structure and the exemplary slats placed into and positioned in the exemplary bin.

FIG. 42 is a detail view showing how the exemplary slat is fastened to the exemplary crossdrive finger.

FIG. 43 is a perspective view showing the exemplary actuator structure and the exemplary slats placed into and positioned in the exemplary bin.

FIG. 44 is a back end view showing the exemplary actuator structure and the exemplary slats placed into and positioned in the exemplary bin.

Figure 1:
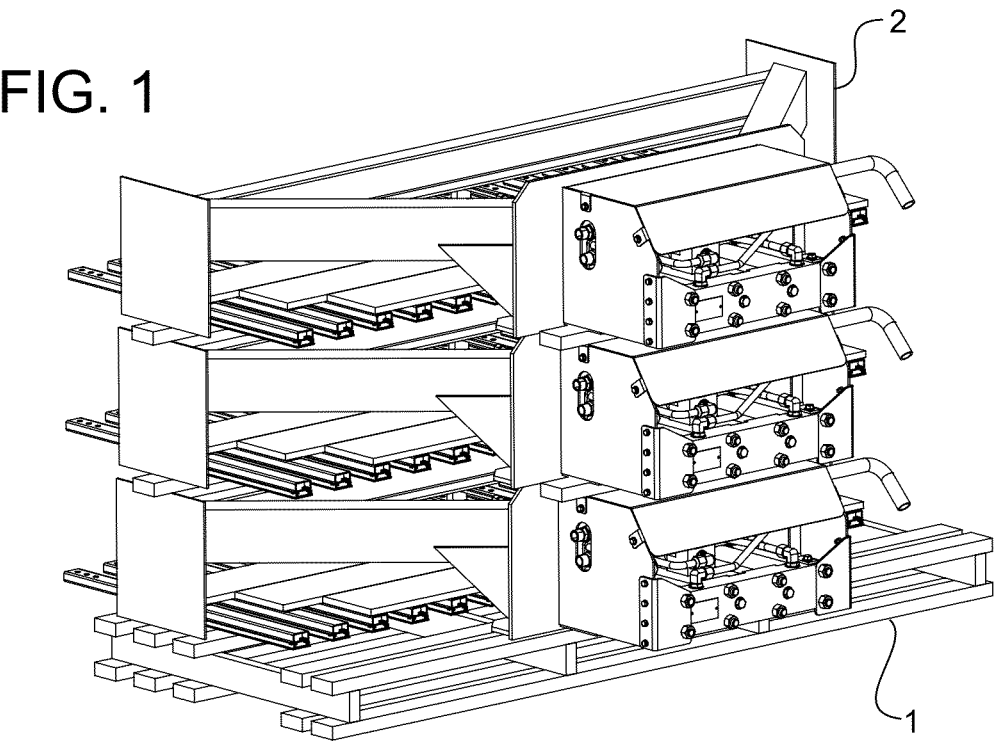
FIG. 1 is a perspective view of one way a few exemplary actuator structures may be packaged for shipping and handling.
Figure 2:
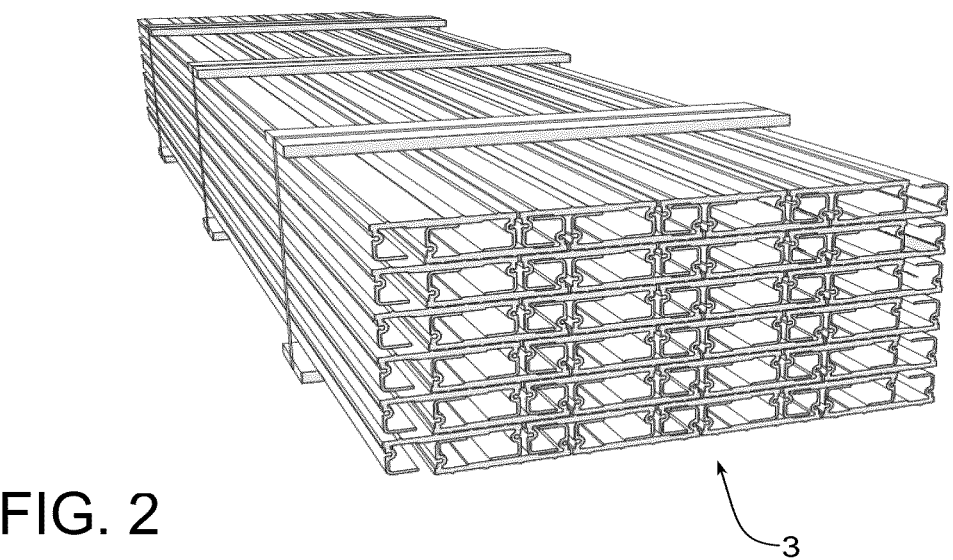
FIG. 2 is a perspective view of a bundle of exemplary slats.
Figure 3:
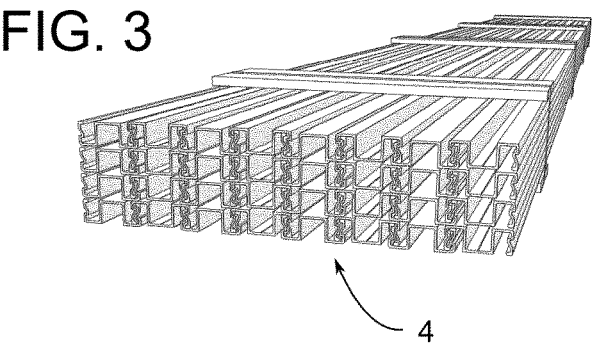
FIG. 3 is a perspective view of a bundle of exemplary slat guides.
Figure 4:
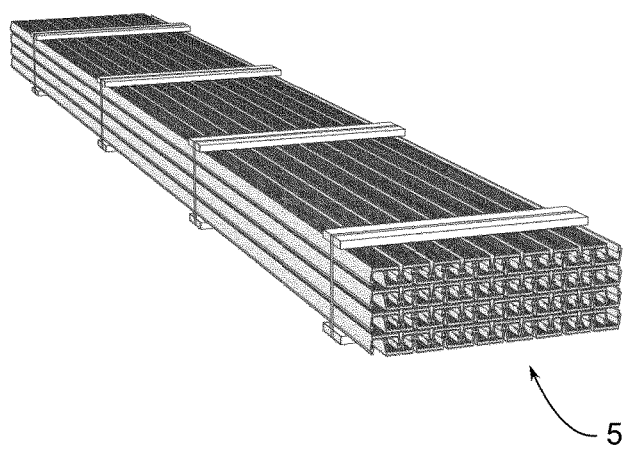
FIG. 4 is a perspective view of a bundle of exemplary slat guide bearings.
Figure 5:
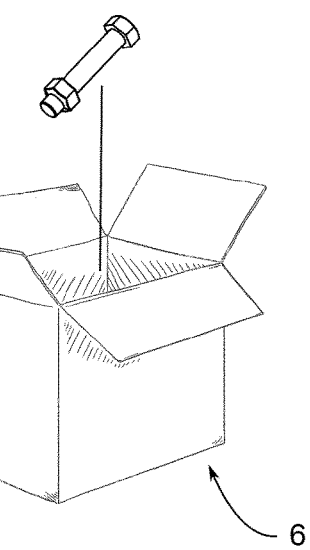
FIG. 5 is a perspective view of a box of fasteners with an exemplary fastener being removed.
Figure 6:
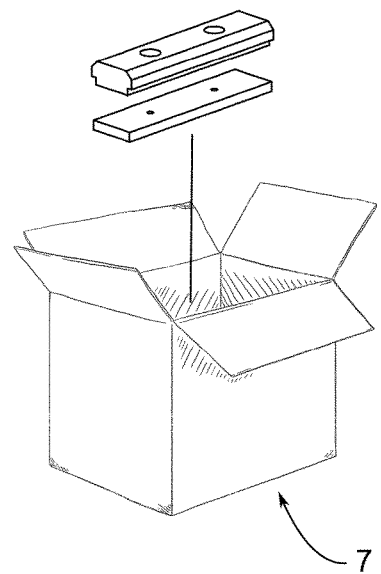
FIG. 6 is a perspective view of a box of removable exemplary slat guides with one being removed from the box.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION

The present invention is directed to a structure and method for mounting a conveyor drive system inside a load-holding compartment (bin). As shown in FIGS. 35-37, the load-holding compartment (bin) has a bin floor 39, a front bin end 130 at one end of the bin floor 39, a back bin end 131 (also referred to as the discharge end 131) opposite the front bin end 130, and bin sides 132 spanning the distance between the front bin end 130 and the back bin end 131. Preferably, the conveyor drive system described herein is of a reciprocating slat type such as those described in the Hallco Patents. Preferred conveyor drive systems described herein preferably are designed to attach a reciprocating slat conveyor drive system inside a bin.

Preferably, the conveyor drive system described herein can be fit into many different styles of mobile or stationary load-holding compartment (bins) with very little change to the bin, the system or how the bin is installed. Exemplary bin construction styles include, but are not limited to, the following exemplary bin styles: 1) open, flat surface with no walls; 2) flat surface with side walls only; 3) flat surface with side walls and a front wall; and 4) open floor framework with side walls, a front wall, and a back wall.

Preferably, although not necessarily, conveyor drive systems described herein have a drive system (shown in FIG. 7 as actuator structure 11 that preferably includes an actuator 8, a framework 9, and a cross-drive assembly 10) that can be shipped, handled, and installed as a unit having few, if any, loose parts that must be assembled by the bin manufacturer. Still further, preferably the conveyor drive systems can be installed inside of an existing bin that was designed to discharge the load using the force of gravity, for example, without needing to modify the structure of the bin or conveyor drive system.

Preferred conveyor drive systems preferably include the following exemplary components: a plurality of linear actuators, a plurality of linear-actuator-to-slat connectors (cross-drives), and a framework to attach the stationary components of the linear actuators to the top surface of the floor of a load-holding compartment. These components are structured as follows. The stationary components of a plurality of linear actuators are fastened to the framework. The plurality of crossdrives are joined to the moving components of the plurality of linear actuators so that they move together. The structure of these components is such that they can now be handled as one component. Handling and installation is now easily accomplished by placing this structure (actuator structure) inside a load-holding compartment such that the moving slats of a reciprocating slat conveyor drive system line up with and can be easily attached to the crossdrive components of the structure. The framework of the structure is then attached to the top surface of the compartment floor wherever the two come in contact.

With this conveyor assembly, it is possible to convey any number of load materials, such as, but not limited to, aggregates, biomass, agriculture feeds, construction debris, municipal solid waste, and recyclable materials. If the load-holding compartment is made to hold liquid then this system will allow liquid containing materials (e.g. food waste) or hazardous substances (e.g. medical waste), to be contained and conveyed so that the liquid does not leak out of the compartment onto the ground.

One of the preferred conveyor drive systems disclosed herein is an actuator structure that is made up of at least the following components:

(1) a plurality of linear actuators;
(2) a plurality of linear-actuator-to-slat connectors (cross-drives); and (3) a framework to attach the stationary components of the linear actuators to the top surface of the floor of a load-holding compartment (bin).

These components are structured as follows. The stationary components of a plurality of linear actuators are fastened to the framework. The plurality of crossdrives are joined to the moving components of the plurality of linear actuators so that they move together. The structure of these components is such that they can now be handled as a unitary component. Handling and installation is now easily accomplished by placing this structure (actuator structure) inside a load-holding compartment such that the moving slats of a reciprocating slat conveyor drive system line up with and can be easily attached to the crossdrive components of the structure. The framework of the structure is then attached only to the top surface of the compartment floor wherever the two come in contact.

The framework of the actuator structure may have one or more of the following:
(1) actuator fixing means for retaining the actuators substantially parallel to the floor and the long axis of the slats;
(2) stiffener means to keep the actuator fixing means from bending and warping;
(3) attachment foot or feet for attaching the actuator fixing means to the floor;
(4) gusset(s) to maintain the orientation of the actuator fixing means relative to the floor;
(5) truss(es) (framework) to convey actuator forces from the actuator fixing means to a point or points far from the actuator fixing means in a direction that is generally the same as the applied forces; and
(6) side walls to transfer the forces conveyed by the truss(es) to the floor at a point or points far from the wall.

The crossdrives of the structure may have one or more of the following components:
(1) beam(s) with their longest size parallel with the floor and perpendicular to the longest dimension of the slat(s);
(2) finger like member(s) attached to each beam with longest size parallel with the slats for removably attaching the slat(s) to the beam(s);
(3) clamp(s) that removably attach the beam(s) to the moving portion of the actuator(s);
(4) surface(s) that engage(s) crossdrive guide bearings restricting the motion of the crossdrive in line with the slat longest dimension;
(5) hole(s) or other structure for removably attaching beam(s) to the slat(s); and
(6) replaceable low friction wear surface(s) that engage crossdrive guide bearings.

The actuator structure may include one or more of the following components:
(1) one or more of linear-actuator-to-slat connector stabilizer guides (crossdrive guide bearings) including one or more of the following components:
 (a) surface(s) that contact(s) and restrict(s) the motion of the crossdrive(s) in line with the longest dimension of the slat;
 (b) means for substantially immovably attaching to the floor;
 (c) replaceable low friction wear surface(s) that contact(s) the crossdrive;
 (d) removable means to hold the low friction wear surface(s) substantially immovable; and
 (e) means for substantially immovably attaching the crossdrive motion restriction means to the framework; and
(2) means of covering the linear actuators to protect them from hazards and to make them more attractive.

The disclosed structure is unique in that it is structurally different from known structures or solutions. More specifically, the structure is unique due to the presence of:
(1) a load distributing triangular shaped truss framework made of beams;
(2) actuator attachment components that are attached to one corner of the triangle at a point that is underneath the beams of the triangle oriented so the moving parts of the actuators extend and retract under the space outlined by the triangle beams; and
(3) side wall plates that support the other two corners of the triangle so that the entire triangle truss (framework) is supported over the top of the moving portion of the actuators and the crossdrives.

Furthermore, the method associated with the aforementioned structure is likewise unique. More specifically, the disclosed method owes its uniqueness to the fact that:
(1) the entire drive system is assembled by the conveyor manufacturer so there is only one drive system component to handle and install; and
(2) it requires the drive system to be attached only to the top of the floor of the bin.

Preferred conveyor drive systems are unique because they have a framework that attaches the actuators to only the top surface of the floor of a load-holding compartment. The framework prevents the flexing of the actuators up and down and forward and back by providing a truss (framework) to transfer the actuator loads far away from the actuator attachment. This far away point is also located on the top surface of the bin floor. The truss (framework) design still allows full access to the moving components of the actuator for maintenance.

The framework of this structure is located over the top of the moving components of the actuator. This causes the assembly of the actuators, frame, and moving components to be compact and easy to handle. All of the drive components can be handled and installed as one component.

This disclosure below provides additional detailed and specific descriptions that refer to the accompanying drawings. The drawings and specific descriptions of the drawings, as well as any specific or alternative preferred conveyor drive systems discussed, are intended to be read in conjunction with the entirety of this disclosure. The structure and method for mounting a conveyor drive system inside a load-holding compartment may, however, be embodied in many different forms and should not be construed as being limited to the preferred conveyor drive systems set forth herein; rather, these preferred conveyor drive systems are provided by way of illustration only and so that this disclosure is thorough, complete and fully convey understanding to those skilled in the art.

Exemplary conveyor drive systems may be better understood with reference to the drawings, but these conveyor drive systems are not intended to be of a limiting nature. The same reference numbers are used throughout the drawings and description in this document to refer to the same or like parts. Unless specified otherwise, the shown shapes and relative dimensions are preferred, but are not meant to be limiting unless specifically claimed, in which case they may limit the scope of that particular claim.

Before describing the exemplary conveyor drive systems and the figures, some of the terminology should be clarified.

Please note that the terms and phrases may have additional definitions and/or examples throughout the specification. Where otherwise not specifically defined, words, phrases, and acronyms are given their ordinary meaning in the art. The following paragraphs provide basic parameters for interpreting terms and phrases used herein.

The term "associated" is defined to mean integral or original, retrofitted, attached, connected (including functionally connected), positioned near, and/or accessible by.

It should be noted that relative terms are meant to help in the understanding of the technology and are not meant to limit the scope of the invention. Similarly, unless specifically stated otherwise, the terms "first" and "second" are meant solely for purposes of designation and not for order or limitation.

It should be noted that some terms used in this specification are meant to be relative. For example, the term "top" is meant to be relative to the term "bottom." The term "front" is meant to be relative to the term "back." Rotation of the system or component that would change the designation might change the terminology, but not the concept.

Terms such as "may," "might," "can," and "could" are used to indicate alternatives and optional features and only should be construed as a limitation if specifically included in the claims. It should be noted that the various components, features, steps, or embodiments thereof are all "preferred" whether or not it is specifically indicated. Claims not including a specific limitation should not be construed to include that limitation.

Unless specifically stated otherwise, the term "exemplary" is meant to indicate an example, representation, and/or illustration of a type. The term "exemplary" does not necessarily mean the best or most desired of the type.

It should be noted that, unless otherwise specified, the term "or" is used in its nonexclusive form (e.g. "A or B" includes, but is not limited to, A, B, A and B, or any combination thereof). It should be noted that, unless otherwise specified, "and/or" is used similarly (e.g. "A and/or B" includes, but is not limited to, A, B, A and B, or any combination thereof). It should be noted that, unless otherwise specified, the terms "includes," "has," and "contains" (and variations of these terms) mean "comprises" (e.g. a device that "includes," "has," or "contains" A and B, comprises A and B, but optionally may contain C or additional components other than A and B).

It should be noted that, unless otherwise specified, the singular forms "a," "an," and "the" refer to one or more than one, unless the context clearly dictates otherwise. Similarly, unless specifically limited, the use of singular language (e.g. "component," "module," or "step") may include plurals (e.g. "components," "modules," or "steps"), unless the context clearly dictates otherwise.

FIGS. 1-6 illustrate the components that may be used to make up a conveyor kit that is made by the conveyor manufacturer and shipped to the bin manufacturer. The components of the kit preferably include the following:
(1) a pallet or shipping rack 1 that holds one or more of the actuator structures 2;
(2) a long bundle of slats 3;
(3) a long bundle of slat guides 4;
(4) a bundle of slat guide bearings 5;
(5) a box containing fasteners 6; and
(6) a box of removable slat guides 7.

The components of the kit are preferably shipped together. The kit components may then be assembled in a load-holding compartment.

Figure 7:
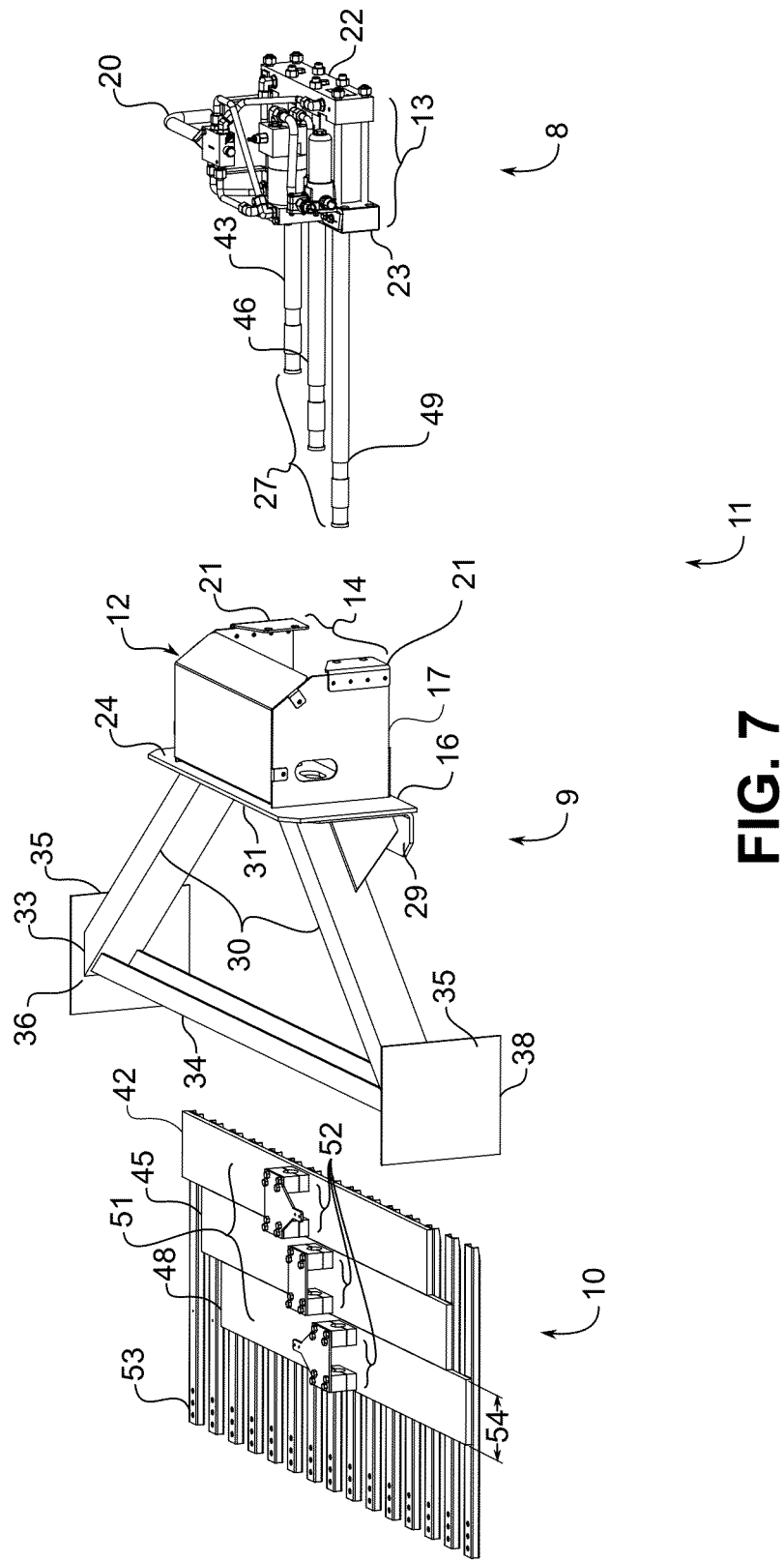
FIG. 7 is an exploded view of an exemplary actuator structure showing the major components.
Figure 8:
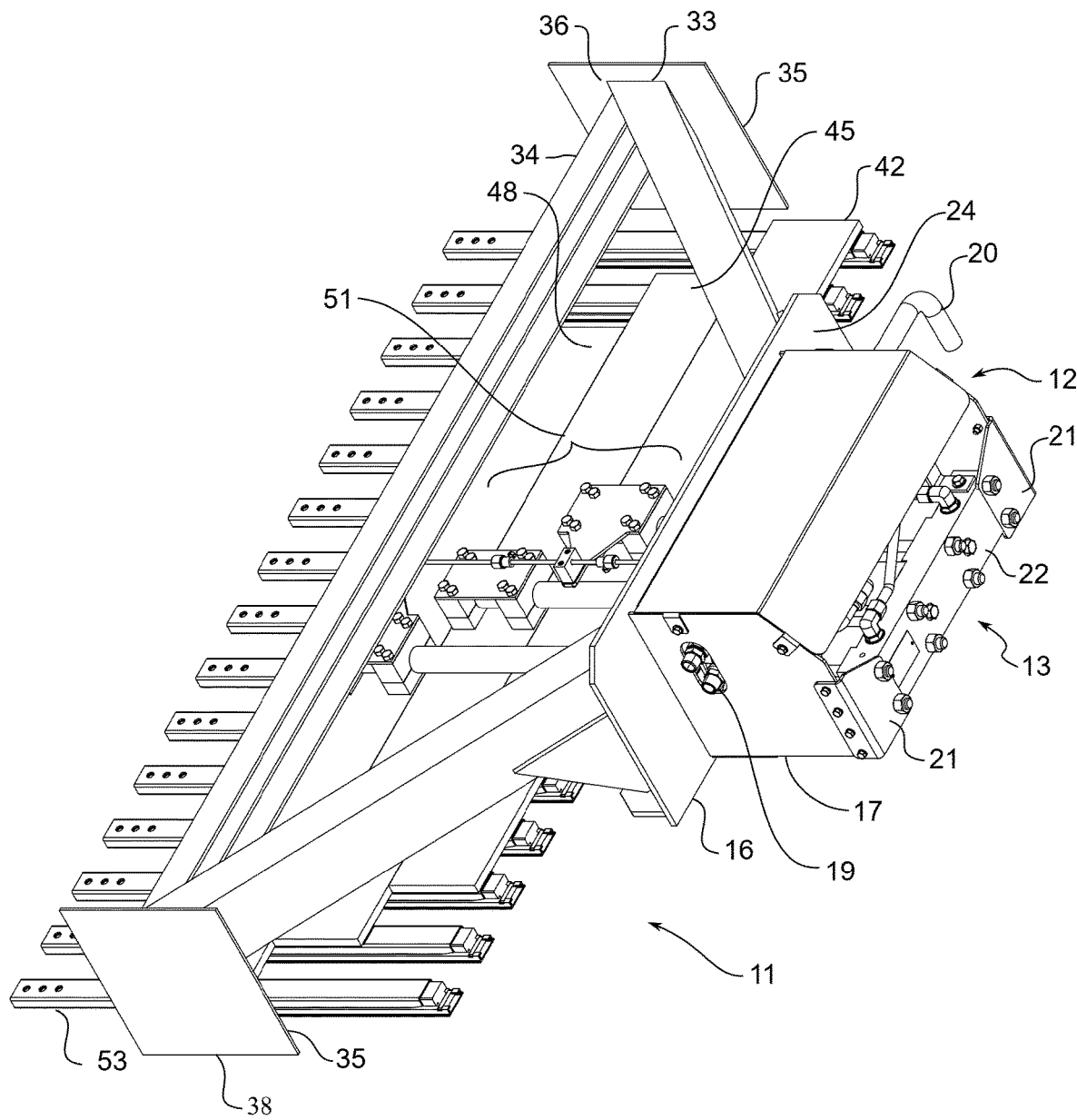
FIG. 8 is a top front isometric view of the exemplary actuator structure.
Figure 9:
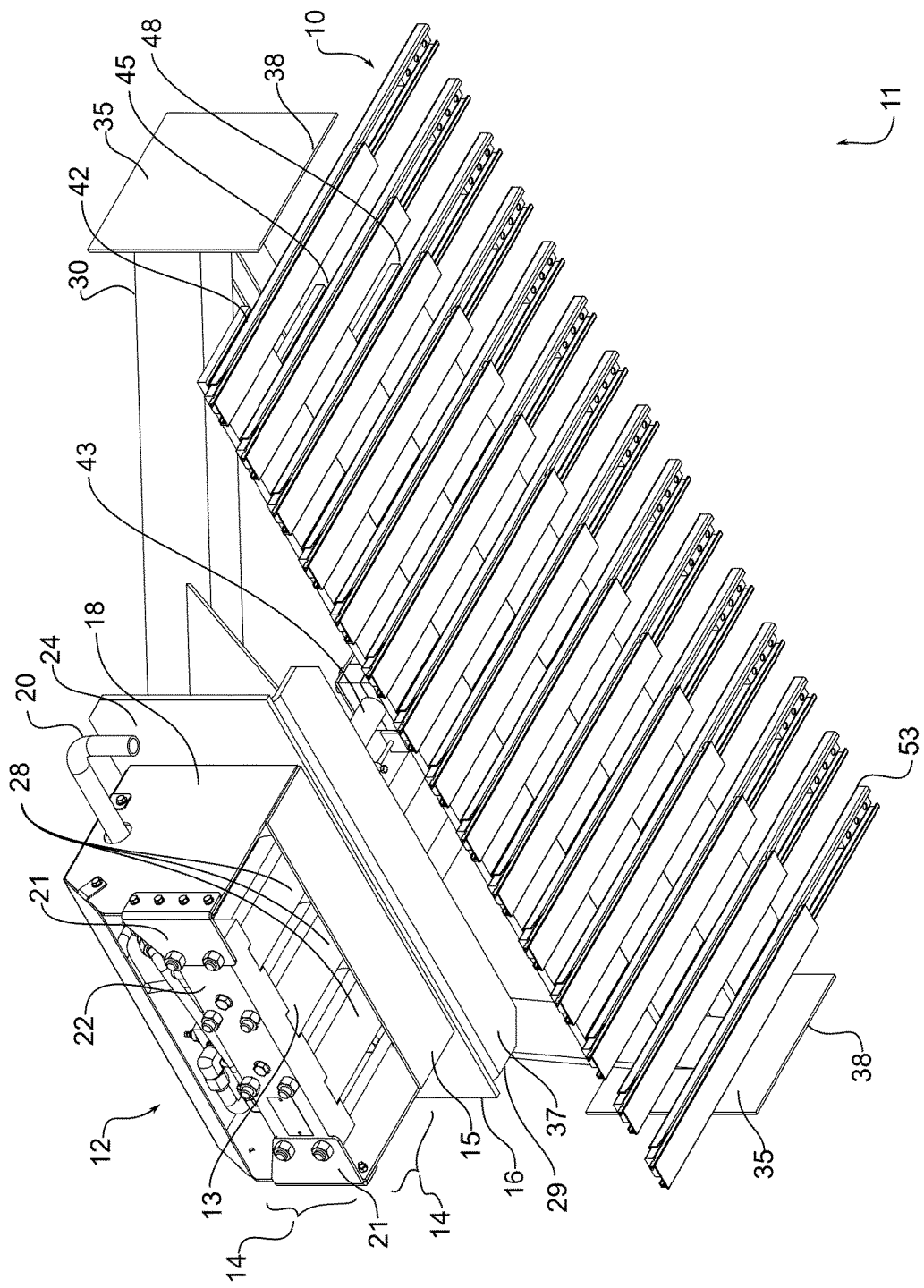
FIG. 9 is a bottom front isometric view of the exemplary actuator structure.

FIGS. 7-21 illustrate an exemplary actuator structure 11 and its components. FIG. 7 shows an exploded view of the exemplary main subcomponents of the actuator structure:
(1) an actuator 8 made of a plurality (shown as three) stationary hydraulic cylinders capped by common manifolds with a plurality (shown as three) moving shafts, each shaft associated with (e.g. extending from) a respective of the end of each cylinder;
(2) a framework 9 that is shown as including the partially enclosed compartment 12, the truss (back wall 16, the sub-truss 30, the sub-truss 34), and the side walls 35; and
(3) a cross-drive assembly 10 that includes a plurality of linear-actuator-to-slat connectors 42, 45, 48 (also referred to as "crossdrives") as shown in FIG. 18.

FIGS. 7-24 and 26 illustrate details of and/or the assembled actuator structure 11. When assembled, the actuator structure 11 preferably has an at least partially enclosed compartment 12 (also referred to as the enclosure 12) that covers the stationary end 13 (FIGS. 7, 8, 9, and 21) of the actuator structure 11. The shown front and bottom of the compartment 12 are preferably at least partially open while the two sides and top are preferably at least partially covered. As shown, the bottom side has a partial wall 15 (FIGS. 9, 11, and 15) that contacts the back wall 16 and both side walls 17 and 18 of the compartment 12. One of the side walls 17 of the compartment 12 has an opening out of which extend fittings for attaching the hydraulic pressure and return tubes 19. The other side 18 of the compartment 12 has an opening out of which a control handle 20 extends. This control handle 20 is used to control whether the conveyor is in neutral, unloading, or loading mode. There are angle brackets 21 that are fastened to each side wall and extend across the front end 22 of the stationary end 13 of the actuator 8. The front end 22 of the stationary end 13 of the actuator 8 is preferably fastened to these brackets 21. (See FIGS. 15-17 and 20-21 for views of the framework and the actuator separated.) The back wall 16 of the enclosure 12 is substantially thicker than any of the other walls. The back face 23 of the stationary end 13 of the actuator 8 is in contact with the front face 24 of the back wall 16. It is fastened using preferably four large bolts with nuts. The back wall 16 has an opening 25 for the valve control rod 59 (also referred to as the large diameter rod of the back wall 16 and shown in FIGS. 10 and 13) and openings for each of the three moving shafts 27 from the three stationary cylinders 28 that are a part of the actuator 8. (It is reasonable to expect that a person skilled in the art of linear actuators would know how to fabricate actuator structure so that there are stationary portions and moving portions including those shown and alternatives (e.g. stationary shafts and moving cylinders) thereof. Hydraulically driven actuators may be replaced by alternative actuators such as electrically driven actuators of the screw variety.) The back wall 16 is preferably vertical except for the lower edge that is shown as being extended horizontally toward the back forming what looks like a a foot 29.

Figure 10:
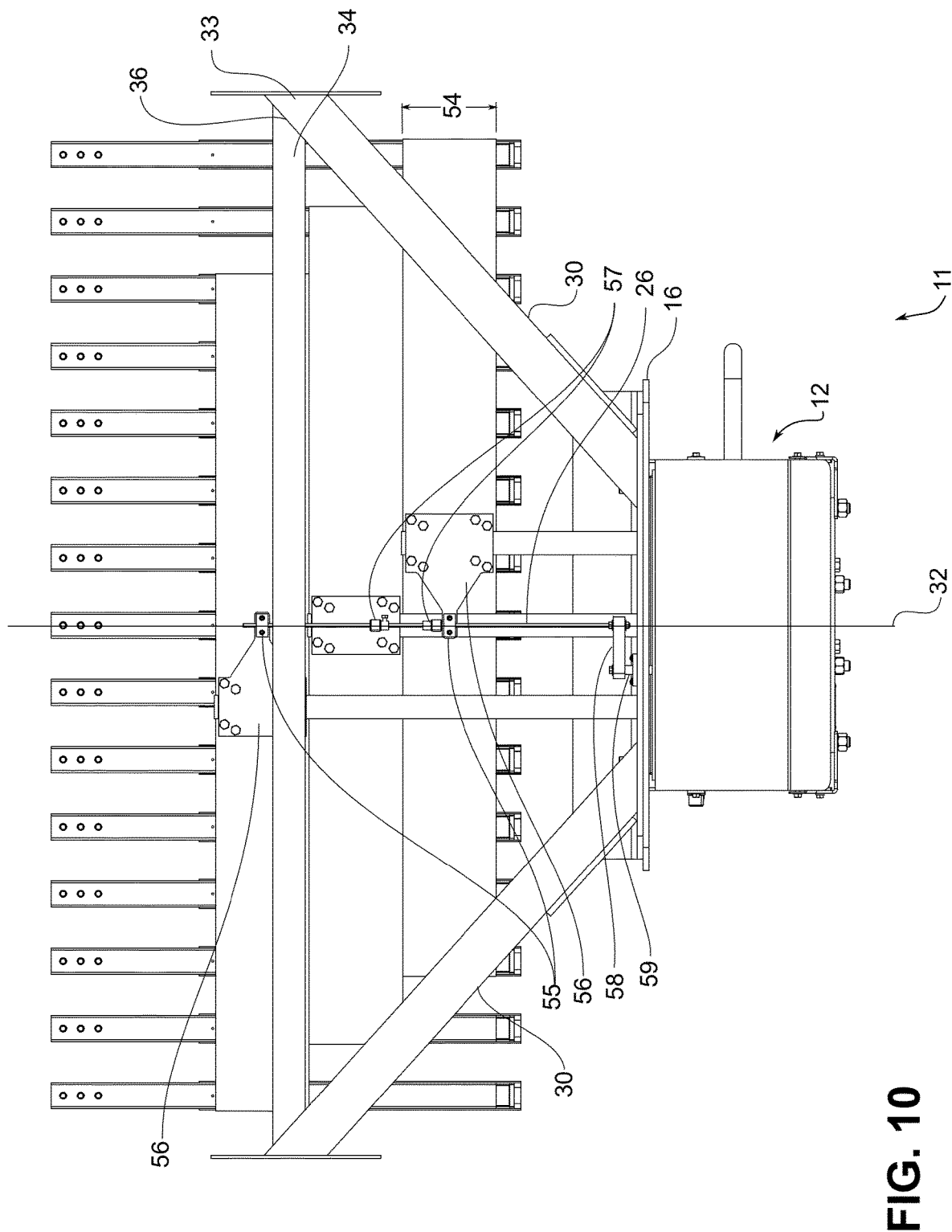
FIG. 10 is a top view of the exemplary actuator structure.
Figure 12:
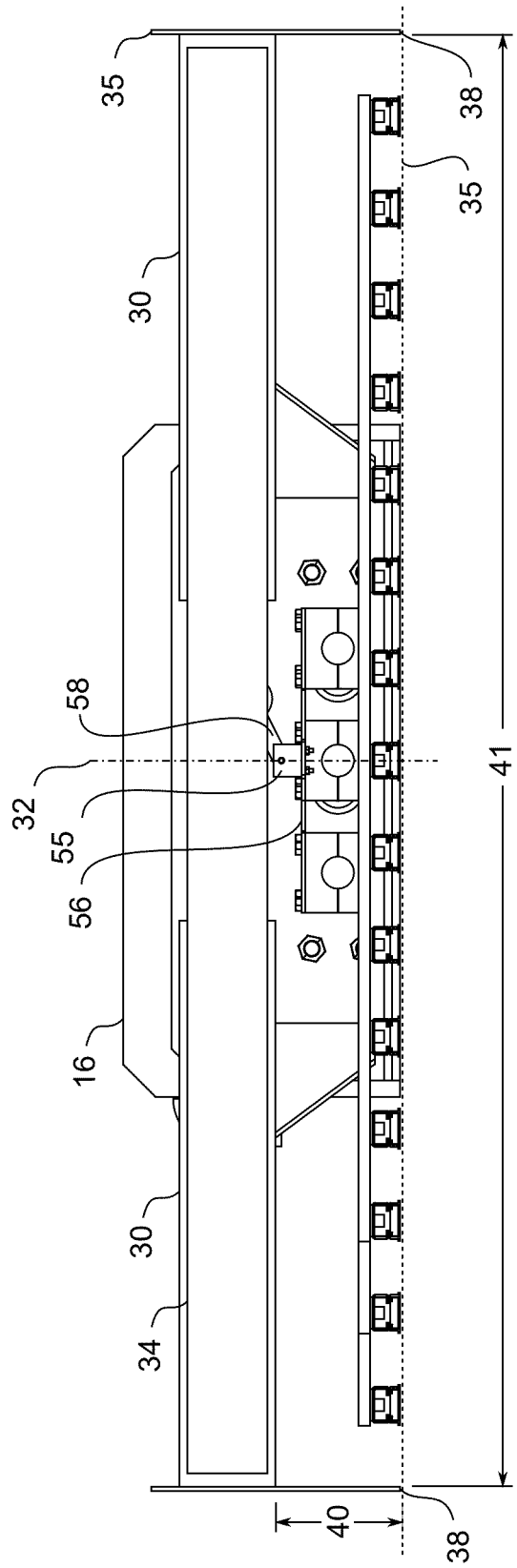
FIG. 12 is a back view of the exemplary actuator structure.

As shown, the framework includes a pair of angled sub-truss members (tubes) 30 and a spanning sub-truss member (tube) 34. The angled sub-truss members are angled such that they are close together at one end and far apart at their other end to form two sides of a triangle. More specifically, one end of each angled sub-truss members is associated with the back wall 16 of the at least partially enclosed compartment 12 and one end of the angled sub-truss members is associated with a side wall 35. The spanning sub-truss member completes the triangle and spans the distance between the two side walls 35. The angled sub-truss members are shown as two rectangular tubes 30 (that may be approximately 4 or 6 inches square), spaced apart, that are mitered to substantially fully contact and be joined to the back face 31 of the back wall 16. These tubes 30 are placed symmetrically about the center vertical centerline 32 (FIGS. 10 and 12). Each tube 30 extends horizontally to the rear but angled outward (shown as approximately 40 to 50 degrees from the center vertical plane) spaced above the shafts 27 (shown as having an approximately 3 inches of spacing). The outward ends 33 of both tubes 30 are joined together by the spanning sub-truss member that may be a horizontal C channel or tube member 34 so that the three components combined form a triangle with one front corner cut off by the back wall 16. The side walls 35 are shown as rectangular, vertical truss side walls that are parallel with the center plane. These side walls 35 are joined to the outward ends of the tubes 30 near where the triangle back member (spanning sub-truss member) 34 is joined to the tube 30. The shown truss side wall 35 is significantly longer in the direction of the centerline 32 than the joint between the angle tube and the truss (framework) side wall. It extends downward to a point that is coplanar with the bottom of the horizontal foot 29 that is the formed edge of the back wall 16 of the enclosure. These three places (the horizontal bottom edge 38 of each of the truss (framework) side walls 35 and the bottom 37 of the formed foot 29 of the back wall 16) are the only places that contact the floor 39 (FIGS. 34-47) when the actuator structure is placed flat on the floor. When the actuator structure is placed flat on the floor 39 there will be a vertical space between the floor and the bottom side of the triangle truss 40 (FIG. 12) and a horizontal space between the two truss side walls 41 (FIG. 12). The actuator shafts 27 project from the back wall 16 of the enclosure into this space. A front crossdrive assembly 42 is attached to a front shaft 43 forming a front moving group. A center crossdrive assembly 45 is attached to a center shaft 46 forming a center moving group. A rear crossdrive assembly 48 is attached to a rear shaft 49 forming a rear moving group. When front, center and rear crossdrives are moving together without space between their beams they appear as one large flat plate 51 with clamping structures 52 attached to the plate and fastened to the shafts 27 (FIG. 7). Long profiles 53 extend out toward the back from underneath the plate. As shown, there are 12 to 25 profiles and they are equally spaced across the length of the plate, forming what looks like a comb or fingers of a hand. Preferably, these finger-like elements 53 are all the same length. There is a small diameter rod (valve control rod 26) that is preferably in at least substantially sliding contact with a couple rectangular blocks 55 located offset from the tops of two of the clamps (FIG. 10). These offset blocks are attached to plates 56 that are fastened to and extend horizontally from the tops of the clamps. There are cylindrical items 57 on the small diameter rod 26 located between each of the rectangular offset blocks 55. The small diameter rod 26 is preferably attached to the end of a bar 58. A larger diameter rod 59 is attached to the other end of the flat bar. This larger rod passes through the back wall 16 of the enclosure. The flat bar 58 between the small rod 26 and the large rod 59 forms an offset attachment between the two to transfer the linear motion of the small rod to the large rod.

Figure 14:
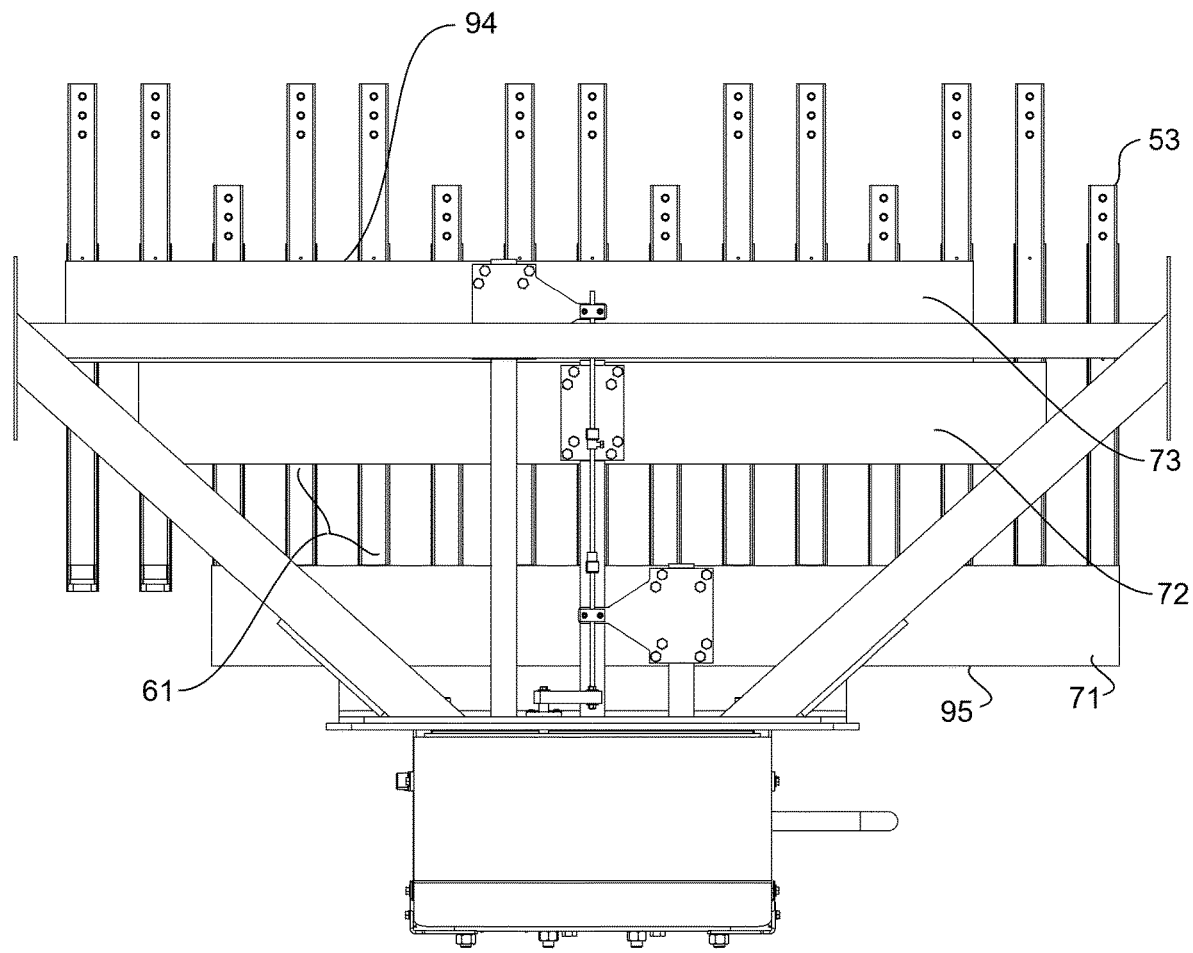
FIG. 14 is a top view of the exemplary actuator structure with the front crossdrive moved forward to its end of stroke.
Figure 15:
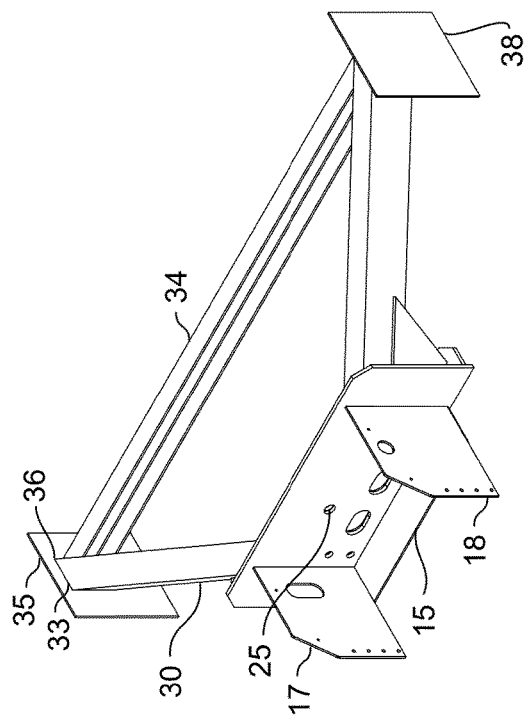
FIG. 15 is a front top isometric view of exemplary actuator framework.
Figure 16:
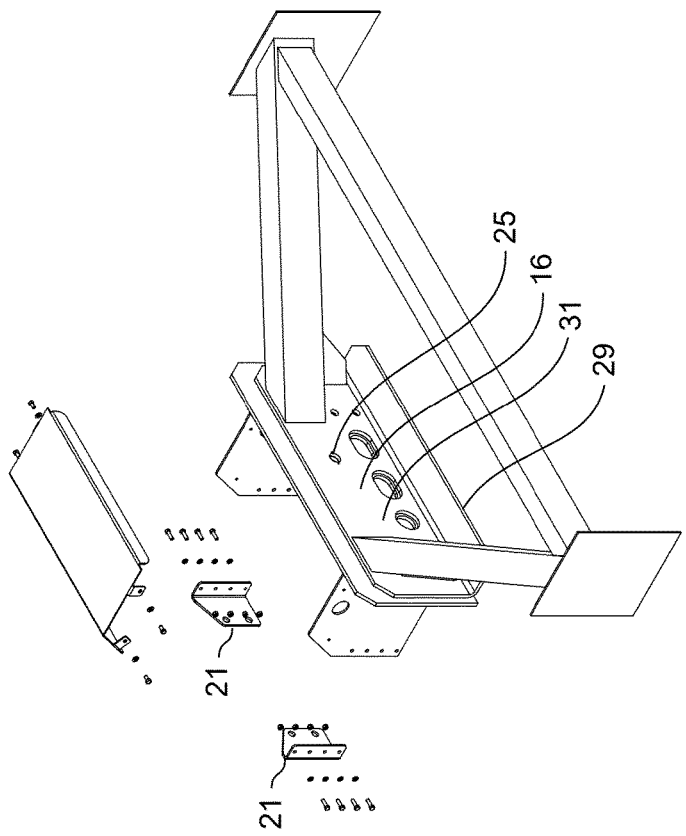
FIG. 16 is an exploded view of a back top isometric view of the exemplary actuator framework the cover and brackets being shown, but removed.
Figure 17:
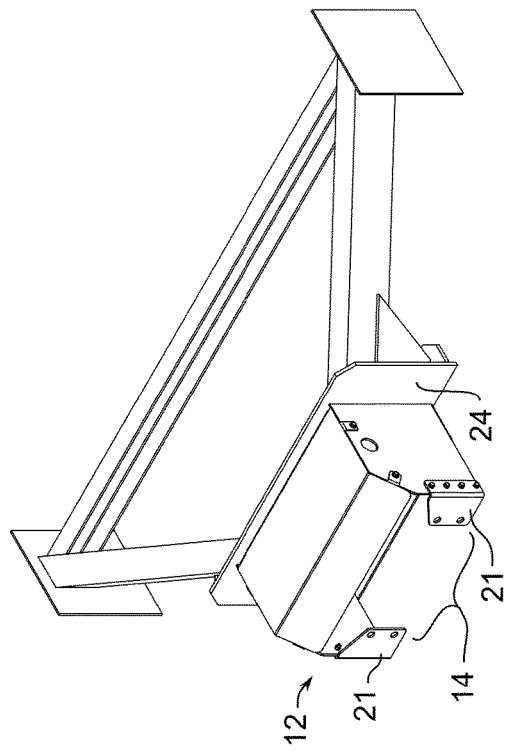
FIG. 17 is a front top isometric view of the exemplary actuator framework with cover and brackets installed.
Figure 18:
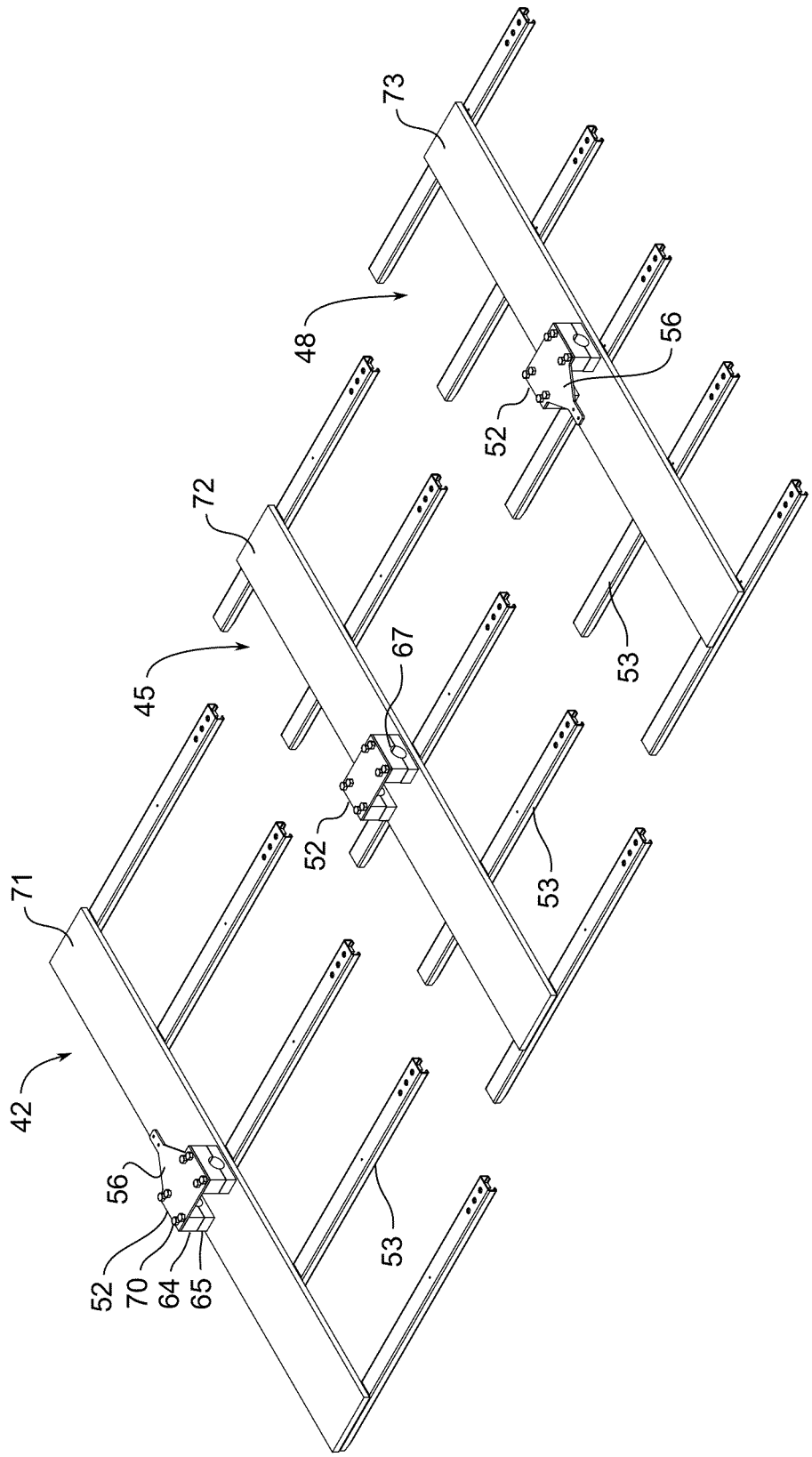
FIG. 18 is a back top isometric view of some exemplary crossdrive assemblies.
Figure 19:
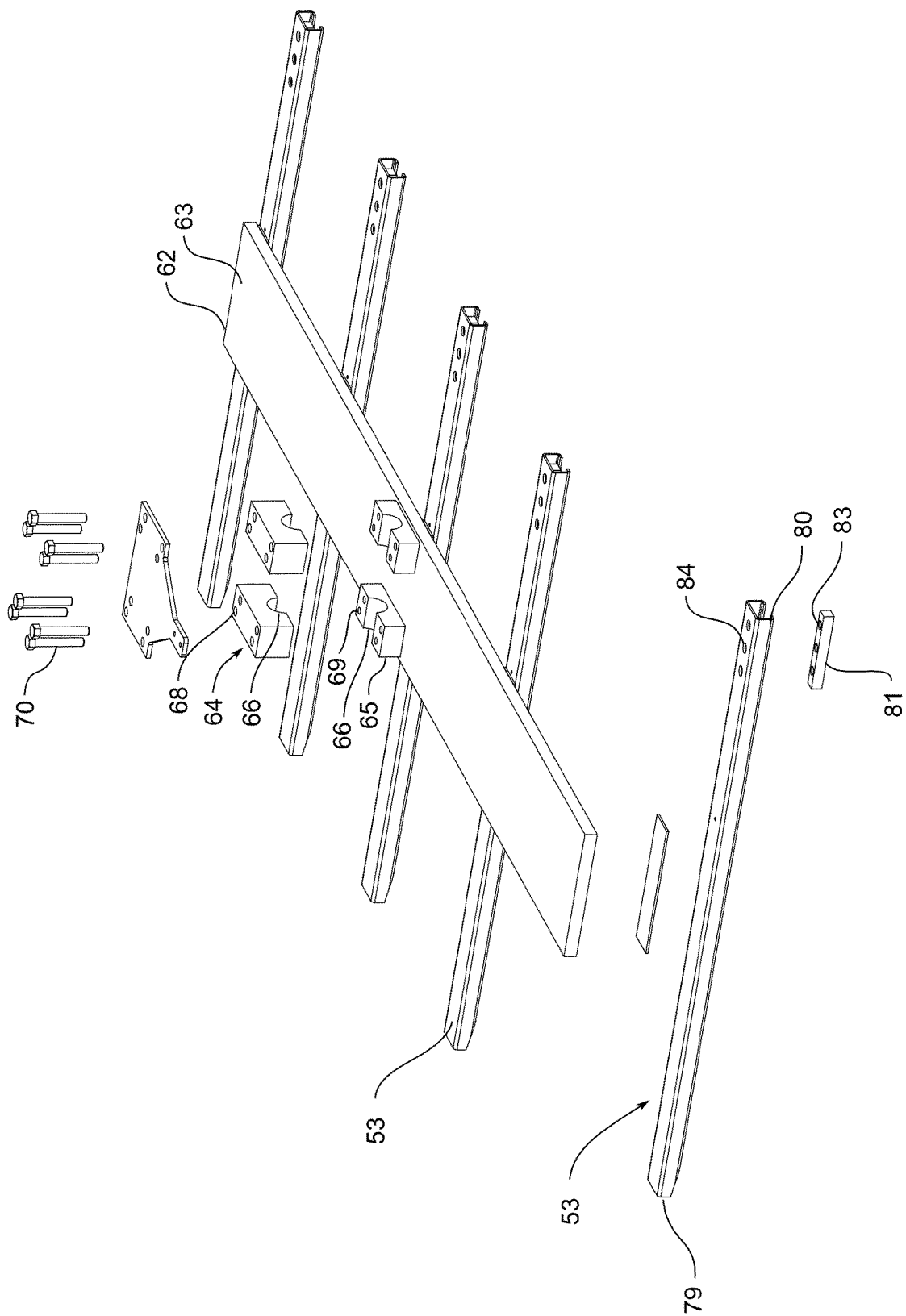
FIG. 19 is a back top isometric view of an exemplary crossdrive showing its components.
Figure 21:
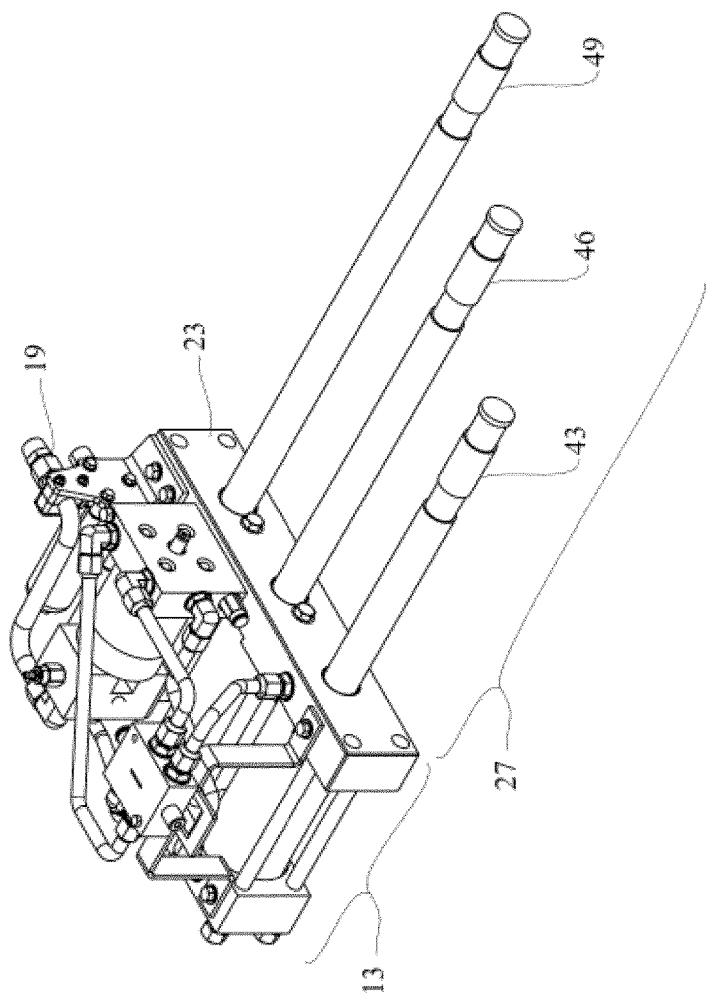
FIG. 21 is a back top isometric view of the exemplary actuator.
Figure 20:
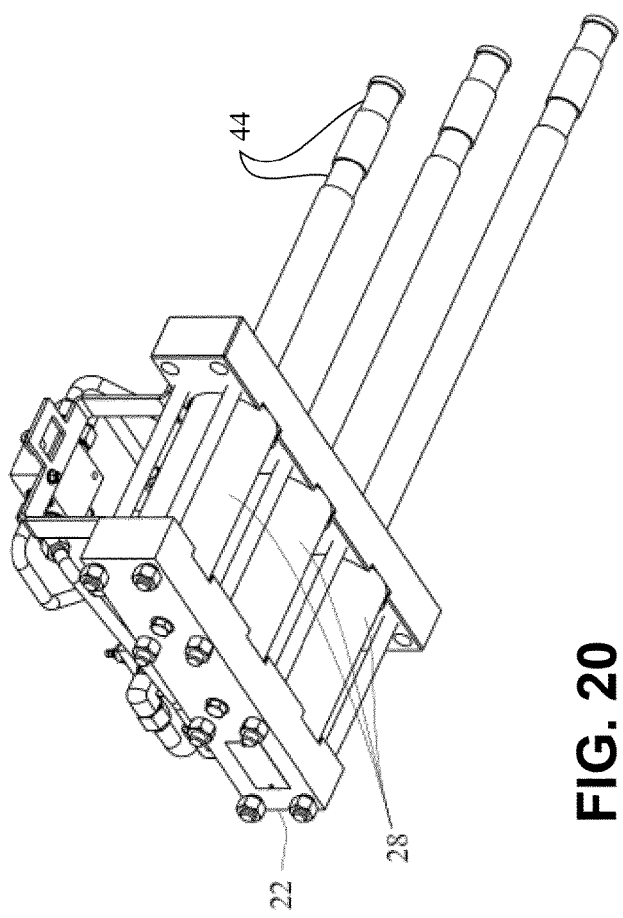
FIG. 20 is a front bottom isometric view of an exemplary actuator.

If the shown crossdrives 42, 45, and 48 are separated with space 61 (FIG. 14) between their beams (as when the conveyor is in the retracting portion of its cycle), each of the three crossdrives may be formed of flat bar beams 71, 72, and 73 (shown as approximately ½ to 1 inch thick, 6 to 10 inches wide, and nearly the length of the space between the truss side walls 35) (FIGS. 18 and 19). At least two clamp assemblies 52 are attached to the top surface 63 of the flat bar. Each shown clamp is made of two flat bars—a top bar 64 and a bottom bar 65. Both shown bars have a semi-circular hole 66 so that when they are stacked with the semi-circular holes adjacent to each other they form a circle surrounding each of the shafts 27. The shown top bar 64 has four through holes 68 and the bottom bar 65 has four threaded holes 69 that match the location of the holes in the top bar so that the shafts may be laid in the semi-circle of the bottom bars and the semi-circle of the top bars may be laid over the shafts and then bolts 70 may be inserted and tightened so that the top bar clamps tightly around the shafts. Preferably, the front crossdrive assembly 42 has a plurality (e.g. 4-13) of finger-like members 53 that extend rearward from under a front flat bar beam 71 far enough to extend rearward around 6 inches past the center 72 and rear 73 crossdrive (flat bar) beams when the front beam 71 is all the way forward and the rear beam 73 is all the way rearward (FIG. 14). The shown center crossdrive assembly 45 has a similar number of finger-like members 53 that extend rearward and forward of the center flat bar beam 72. The shown finger-like members 53 extend forward the same distance as the width 54 of the crossdrive beams and also extend rearward around 6 inches past the rear crossdrive beam 73 when the center crossdrive beam 72 is all the way forward and the rear crossdrive beam 73 is all the way rearward. The shown rear crossdrive assembly 48 has a similar number of finger-like members 53 that extend rearward and forward of the rear flat bar beam 73. The shown finger-like members 53 extend forward the same distance as twice the width 54 of the crossdrive beams and also extend rearward far enough that the ends of these fingers line up with the ends of the other two crossdrives when all of the crossdrives are together and touching (when they are in the conveying portion of the cycle or when they are all at one end of stroke).

Figure 22:
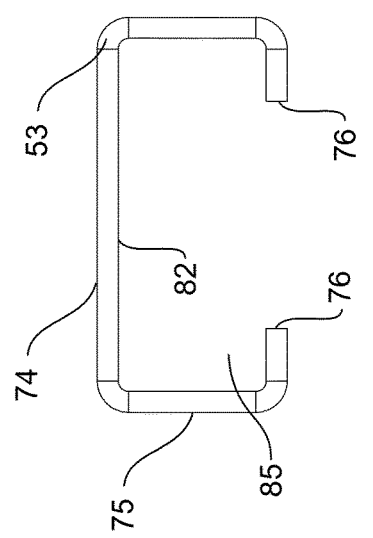
FIG. 22 is a cross-section view of an exemplary crossdrive finger.
Figure 25:
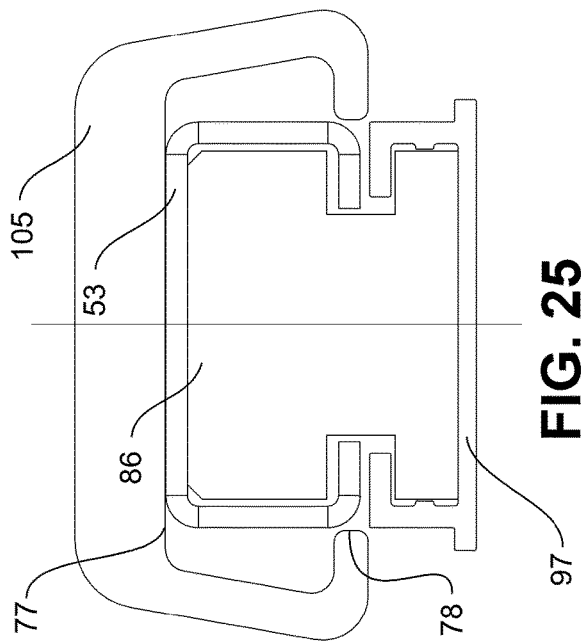
FIG. 25 is a cross-section view showing how an exemplary slat, an exemplary finger, an exemplary figure-eight shaped block, and an exemplary shallow C shape profile fit together.

The fingers 53 of the crossdrives are shown as forming a hooked C shape with the opening facing downward (FIG. 22). The C shape may be formed with a top wall 74, two side walls 75 extending downward from the top wall, and two feet 76 extending inward from the side walls. The width and height of the finger is such that it fits loosely in the space made between the bottom 77 of the top wall 106 of the slat, the inside of the feet 78 of the slat and the floor 39 (FIGS. 25 and 27). The front end 79 of the fingers is preferably open and the back end 80 has a rectangular block 81 attached to the bottom of the top wall 82 and centered between the side walls 75 (FIG. 19). The shown exemplary block may be approximately 5 inches long and may have approximately three threaded holes 83 that may be spaced evenly over its length). The shown exemplary block may be approximately ¾ inch wide and ⅝ inch tall. The top wall of the shoe may have holes 84 in it to match the holes in the block.

Figure 11:
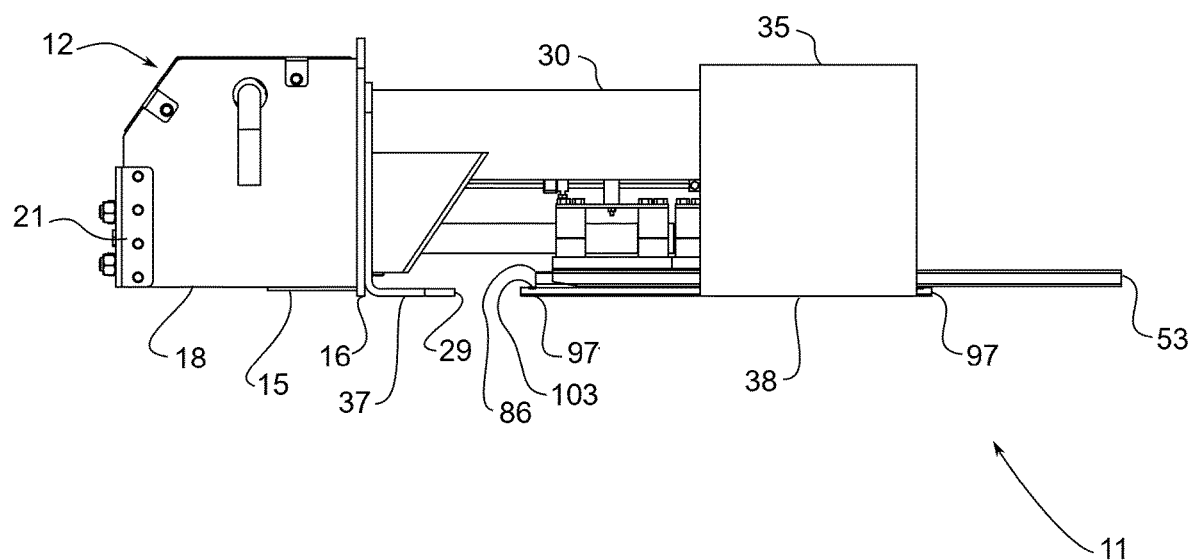
FIG. 11 is a side view of the exemplary actuator structure.
Figure 13:
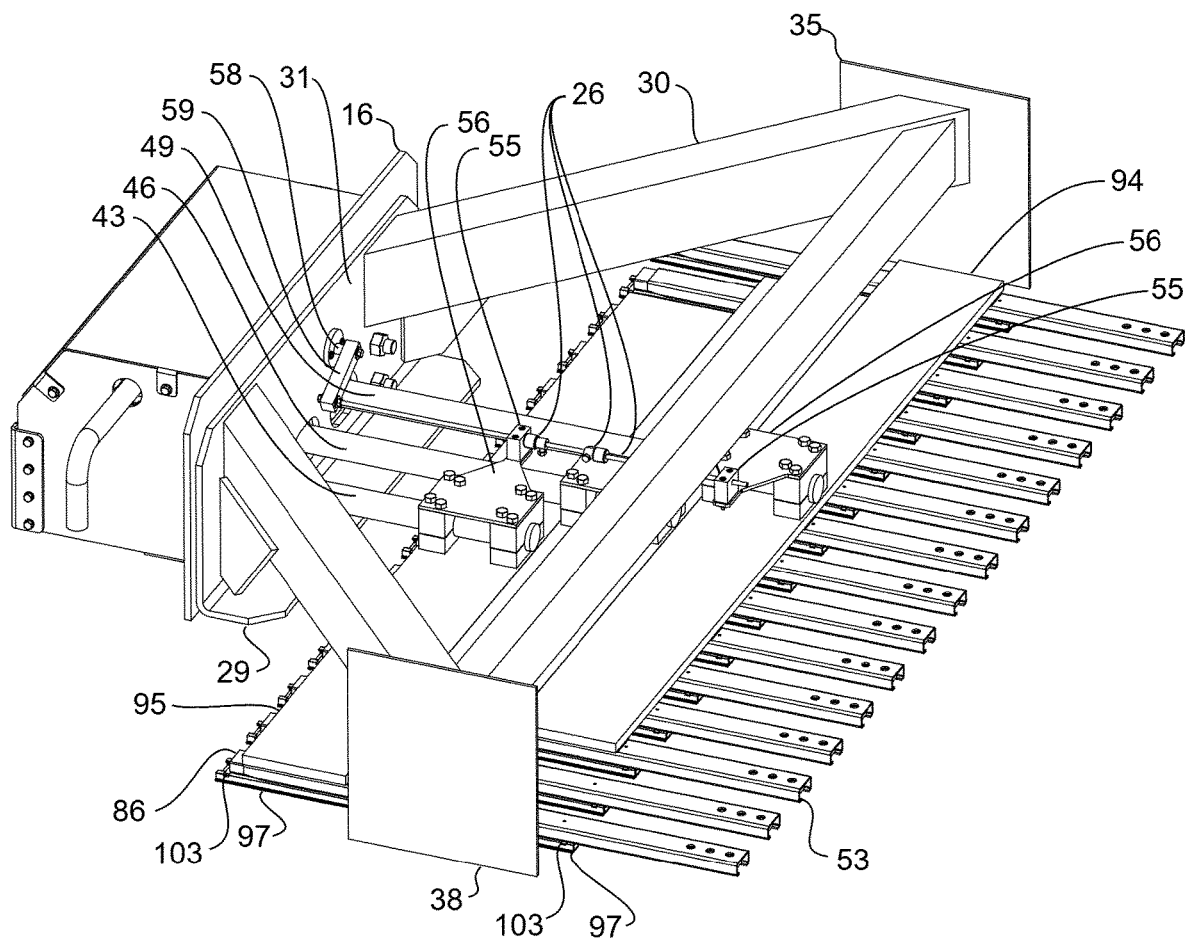
FIG. 13 is a back top isometric view of the exemplary actuator structure.
Figure 23:
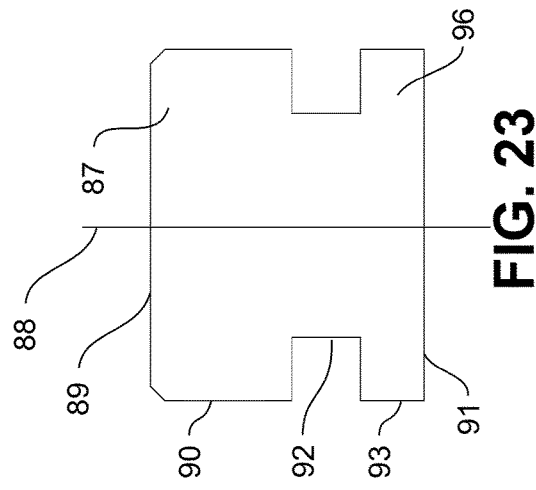
FIG. 23 is a cross-section view of an exemplary figure-eight shaped block for guiding and supporting the crossdrive finger.

Sliding inside 85 the hooked C shape of each finger 53 there is a figure-eight shaped block 86 that appears to be made of a different material than the finger (FIG. 23). Looking at the end 87 of the figure-eight block 86 it is symmetric about the vertical plane 88 and consists of a top 89, sides 90, and bottom 91. Partway down from the top there are side recesses 92 that are preferably cut inwardly to give clearance for the feet 76 of the finger to fit. The portion 93 of the sides 90 that is below the side recesses forms the bottom of the figure-eight shape. The length of this figure-eight shape block is such that when all of the crossdrives are at their rear position the figure-eight shape block extends a little over an inch to the rear of the back 94 of the rear crossdrive beam (FIGS. 11, 13, and 26). It extends forward so that it extends approximately an inch forward from the front 95 of the front crossdrive beam.

Figure 24:
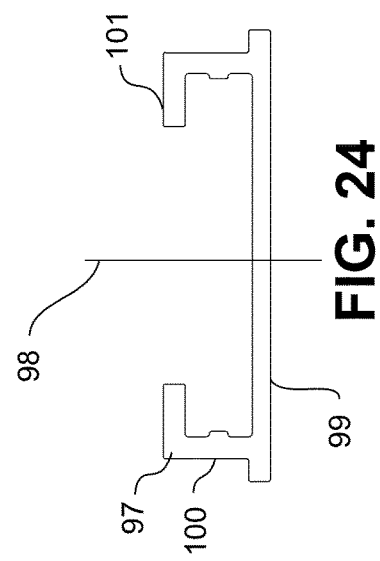
FIG. 24 is a cross-section view of an exemplary shallow C shape profile for containing the figure-eight shaped block.

Sliding over the bottom of the figure-eight shape 96 of the figure-eight shaped block is another component 97 shaped like a shallow hooked C shape opening upwardly (FIG. 24). It is symmetric about the vertical plane 98. It has a flat bottom wall 99, two side walls 100 extending upward from the bottom wall, and hands 101 extending inward from the top of the side walls. These hands also fit inside the side recesses 92 of the figure-eight shaped block (FIG. 25). The material of the upwardly facing C shape member 97 is different from the figure-eight shape block 86. The length 102 of this component is enough that it extends approximately ¾ inch beyond the ends 87 of the figure-eight shaped block 86. The figure-eight shape block 86 is prevented from sliding out of the upwardly facing C shape member 97 by rectangular shape blocks 103 that are attached inside the channel of the C shape member at the ends 104 to capture the figure-eight shaped block 86 (FIG. 26).

There are many different shapes for slats and slat guides (guides) and slat guide bearings (bearings) and removable slat guides (removable guides). Although there are many possible shapes for slats, guides, bearings, and removable guides, a common shape of these will be described here.

The profile of slat 105 is C shaped with the C opening downward. It consists of a top wall 106 and a right and left side wall 107 extending downward from the top wall (FIG. 27). Two feet 108 extend toward the center, one from each side wall.

The slat guide bearing 109 fits inside the somewhat closed C profile of the slat 105 (FIG. 28). It consists of a top wall 110 and a right and a left side wall 111 extending mostly downwardly from the top wall. Partway down, a portion 112 of the side walls changes direction to extend inward for a short distance and then a portion 113 of the side walls proceeds downward for a distance and then a portion 114 of the side walls change direction to extend inward again for a short distance. The bottom of the top wall 77 of the slat is in sliding contact with the top of the top wall 110 of the guide bearing (FIG. 30). The top of the foot 115 of the slat is in sliding contact with the bottom of the first jog 112 of the side wall of the bearing. The inside face 78 of the slat foot is in sliding contact with the outside face 113 of the side wall that is below the first jog of the bearing 112.

The slat guide 116 is generally a rectangular tube shape with an inward recess 117 partway down each of its side walls (FIGS. 29 and 30). It fits inside the C shape of the slat guide bearing 109. The top of the top wall 118 of the rectangular tube is in contact with the bottom of the top wall 110 of the slat guide bearing. The outside of the downward extending side wall 119 of the tube is in contact with the inside vertical portion of the bearing side walls 111. The bottom 120 of the top of the side recess of the tube is in sliding contact with the top of the second inward jog 114 of the side walls of the bearing.

Figure 31:
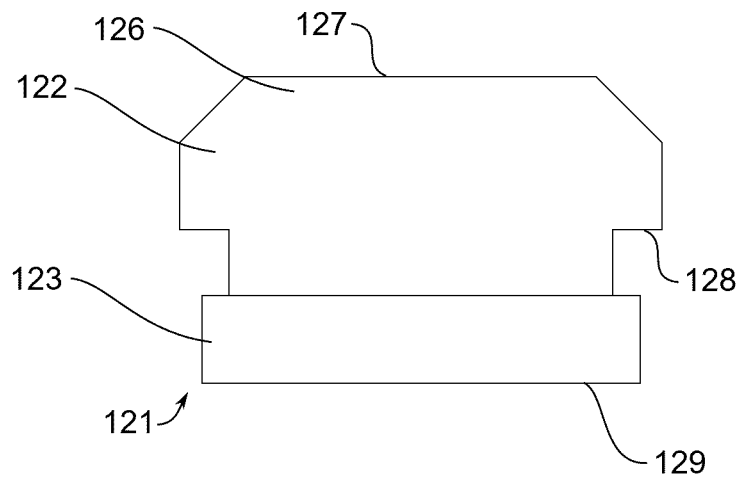
FIG. 31 is a cross-section view of an exemplary removable slat guide.
Figure 32:
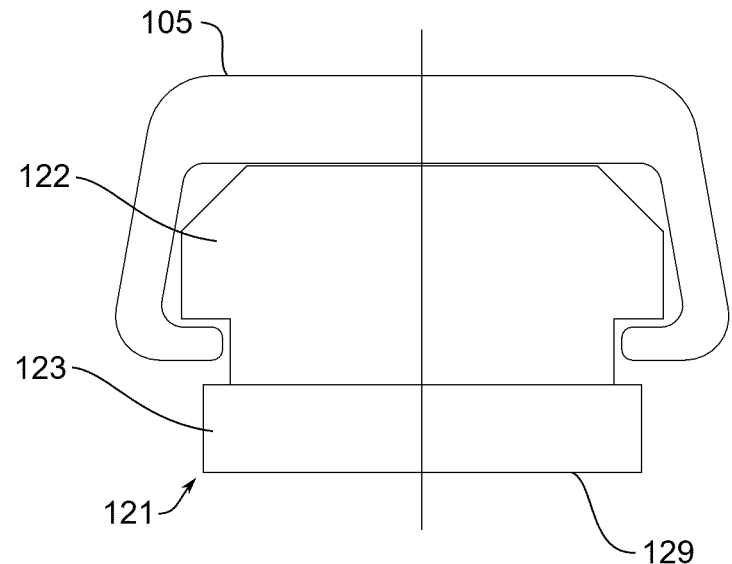
FIG. 32 is a cross-section view showing how the exemplary slat and the exemplary removable slat guide fit together.
Figure 33:
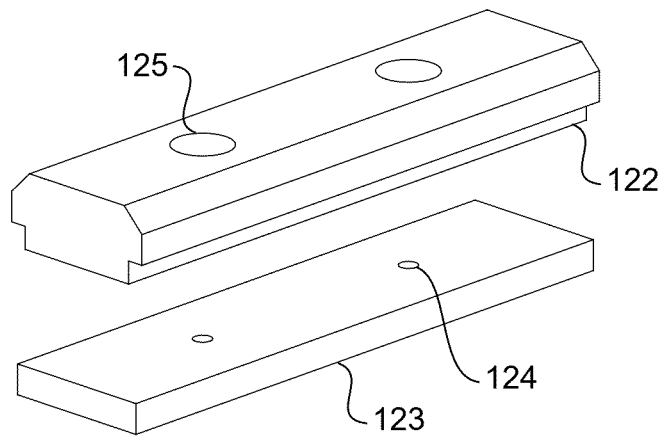
FIG. 33 is an exploded view of the exemplary removable slat guide showing the removable and non-removable parts.

The removable slat guides 121 are composed of two pieces: one is removable 122 and made of a low friction material; the other is not removable 123 and is made of a different material and has threaded holes 124 to accept screws that are inserted through matching holes 125 in the removable part (FIGS. 31-33). The cross-section 126 of the removable portion is shaped like a thick T. The T portion fits inside the C profile of the slat 105 so that the top of the T 127 is in sliding contact with the bottom 77 of the top wall of the slat. The bottom 128 of the cross of the T portion is in sliding contact with the feet 108 of the slat. The permanently attached portion 123 is a rectangular bar with two threaded holes 124 along its center. It is wide enough to substantially support the removable portion 122. The non-removable portion 123 is preferably attached to the floor member 39 of the compartment 12 (FIGS. 34-47).

The bottom wall 129 of the slat guide is attached to the top of the floor members 39 of the compartment. The bearing 109 is kept from vertical and sideways movement by the interlocking shape of the bearing and the slat guide (FIG. 30). The bearing 109 is blocked from large forward and backward motion by placing one or more removable guides 121 at each end of the slat guide 116 and one or more in the middle (FIG. 38). The slat 105 is kept from vertical and sideways movement by the interlocking shape of the bearing and the slat. The slat is allowed to move back and forth along the length of the slat guide and bearing.

Figure 45:
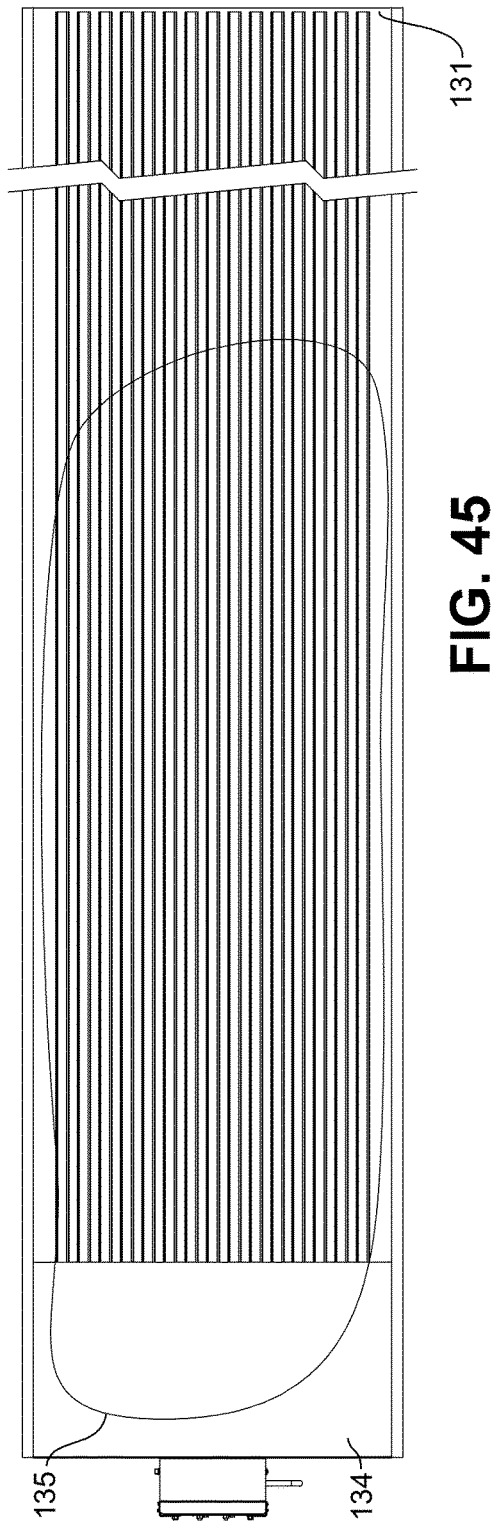
FIG. 45 is a top view showing the exemplary actuator structure covered with an exemplary sloping cover in the exemplary bin.
Figure 46:
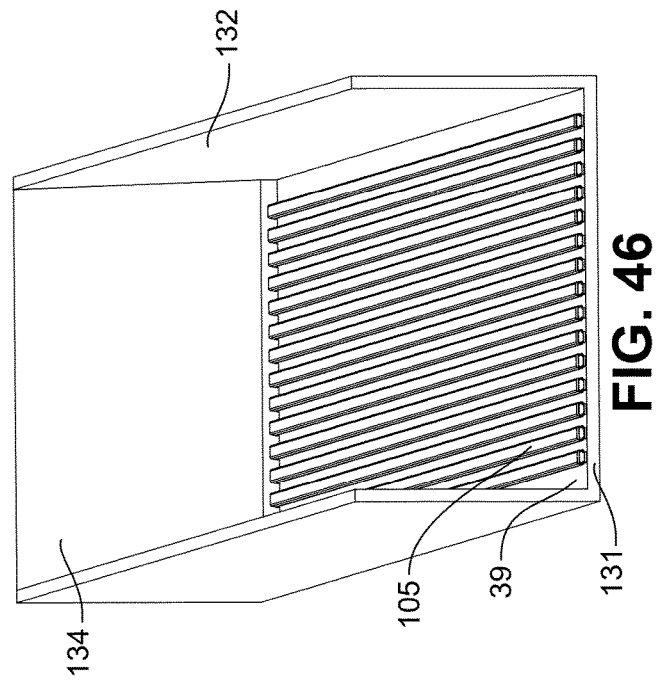
FIG. 46 is a perspective view showing the exemplary actuator structure covered with the exemplary sloping cover in the exemplary bin.
Figure 47:
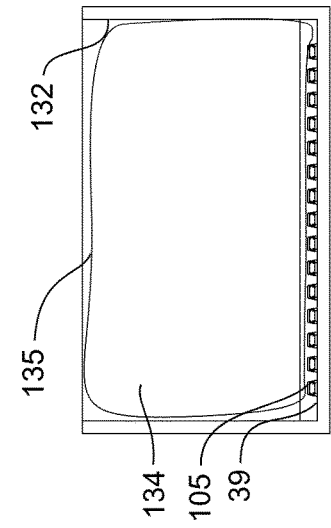
FIG. 47 is a back end view showing the exemplary actuator structure covered with the exemplary sloping cover in the exemplary bin.

FIGS. 34-47 illustrate the steps of an exemplary method for installing this kit into a bin is as follows:
(1) Place an actuator structure 11 into a bin on top of the floor 39. Move it to the end 130 of the bin away from the discharge end 131 and center it between the side walls 132 of the bin. Then attach the actuator structure to the floor by welding all of the accessible points that come in contact with the floor to the floor.
(2) Position the removable slat guide bearings 121 and slat guides 116 in rows that are lined up with the finger elements 53 of the crossdrives. Space the removable slat guide bearings 121 apart with some slat guides 116 between them. Attach, by skip welding, each contact point of these components to the floor. Snap the bearing guides 109 down over and onto the slat guides 116.
(3) Slide slats 105 over the bearings 109 and removable guides 121 starting from the discharge end 131 and up to the crossdrive fingers 53. Fasten one slat 105 to each finger 53 using screw fasteners 133.
(4) Build a protection cover 134 (FIGS. 45-47) over the top of the actuator structure 11 to protect it from load elements 135 (FIGS. 45 and 47).

The structure and method for mounting a conveyor drive system inside a load-holding compartment disclosed herein provides solutions to the problems outlined above by providing an actuator attachment frame designed to be attached only to the top of the floor members of the bin. Since the top surfaces of the floor members are most often at the same level (coplanar), there are no variations between bin designs in this area. The actuator attachment frame design disclosed herein distributes all of the actuator forces over multiple points that are spread apart on the top surface of the floor members of the bin.

The fact that the actuator attachment frame derives its stability from the top surface of the floor members makes it much simpler for the bin manufacturers to create a leak-proof bin as they will not be required to seal around the actuator attachment frame. The actuator attachment frame is preferably attached only to the floor surface that is already sealed.

Using this structure and method the conveyor manufacturer will make very few variations of the actuator structure. Those few variations will fit the majority of bins already designed and being built by the bin manufacturers, including, but not limited to, ones designed for unloading using gravity or other means than reciprocating slat means.

Shipping and handling of the actuator structure is much easier than other designs. This is because all of the components needed for the actuator structure are assembled together and can be handled as one component.

The steps required to install the actuator structure are significantly reduced compared to any other reciprocating slat conveyor actuator structure design that exists currently.

The structure and method described herein provide a reciprocating slat conveyor drive system composed of elongate slat support guides and elongate slats and a unitary drive system mounted to and supported by the top surface of the floor members of a load-holding compartment. The unitary drive system is only supported by the top surface of the members that compose the floor on which the conveyor is installed.

In other words: The present structure and method for mounting a conveyor drive system inside a load-holding compartment relates to a structure and a method associated with the structure. With respect to the structure, it is a reciprocating slat conveyor drive system for use in a load-holding compartment. The system includes a plurality of elongated slats, a plurality of elongated slat guide subdecks and a slat moving apparatus. The slat moving apparatus includes a plurality of crossdrives to which the slats are attached, a plurality of moving portions of a plurality of actuators to which the plurality of crossdrives are attached, a plurality of stationary portions of a plurality of actuators to move the plurality of actuator moving portions, and a framework to which the plurality of stationary portions of a plurality of actuators are attached. The framework is attached only to the top of the floor of the load-holding compartment. The moving apparatus forms an assembly that may be easily shipped and handled and that may be securely mounted onto the inside floor of the load-holding compartment in such a way as to minimize the time and resources needed for installation.

With respect to the associated installation method, in order to carry out the method the following core steps are followed: (1) place the slat moving apparatus into the front of the load-holding compartment and securely fasten it only to the top surface of the floor members of the compartment; (2) securely attach the slat guide subdecks (also referred to as slat guides) to the top surface of the floor members of the compartment; (3) place the slats onto the slat guides and then securely fasten the slats to the crossdrives of the slat moving apparatus; and (4) install some removable structure to cover the slat moving apparatus to protect it from the load. Ultimately, at the conclusion of these steps a fully functional reciprocating slat conveyor will have been installed inside the load-holding compartment.

Different features, variations and multiple different conveyor drive systems have been shown and described with various details. What has been described in this application at times in terms of specific conveyor drive systems is done for illustrative purposes only and without the intent to limit or suggest that what has been conceived is only one particular conveyor drive systems or specific conveyor drive systems.

All references (including, but not limited to, the Hallco Patents disclosed herein) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween. It is also intended that the scope of this disclosure should be determined by a proper legal interpretation and construction of the disclosure, including equivalents, as understood by those of skill in the art relying upon the complete disclosure present at the time of filing.

What is claimed is:

1. A conveyor drive system for installation in a load-holding compartment, said load-holding compartment having a compartment floor having a top surface, said conveyor drive system comprising:
   (a) at least one linear actuator, each said at least one linear actuator having at least one stationary component and a plurality of moving components;
   (b) a framework for attaching said at least one stationary component to said top surface of said compartment floor, said framework comprising:
      (i) a first angled sub-frame member and a second angled sub-frame member, each angled sub-frame member having a first end and a second end;
      (ii) a spanning sub-frame member, said spanning sub-frame member having a first end and a second end;
      (iii) a first side wall and a second side wall, each side wall having a lower edge associatable with said top surface of said compartment floor of said load-holding compartment;
      (iv) the first end of said first angled sub-frame member associated with said at least one stationary component of said at least one linear actuator, the second end of said first angled sub-frame member associated with said first side wall;
      (v) the first end of said second angled sub-frame member associated with said at least one stationary component of said at least one linear actuator, the second end of said second angled sub-frame member associated with said second side wall; and
      (vi) the first end of said spanning sub-frame member associated with said first side wall, and the second end of said spanning sub-frame member associated with said second side wall;
   (c) at least one linear-actuator-to-slat connector, each linear-actuator-to-slat connector attached to at least one of said plurality of moving components, each of said plurality of moving components attached to a particular linear-actuator-to-slat connector moving simultaneously in relation to the movement of said particular linear-actuator-to-slat connector;
   (d) the interconnection of said at least one linear actuator, said framework, and said at least one linear-actuator-to-slat connector allowing said conveyor drive system to be handled as a unitary component.

2. The conveyor drive system of claim 1, said at least one linear actuator having a stationary end associated with said at least one stationary component.

3. The conveyor drive system of claim 1, said at least one linear actuator having a stationary end associated with said at least one stationary component, an at least partially enclosed compartment covering said stationary end.

4. The conveyor drive system of claim 1, wherein said plurality of moving components are a plurality of slats.

5. The conveyor drive system of claim 1, each linear-actuator-to-slat connector attached to at least one of said plurality of moving components from each at least one linear actuator.

6. The conveyor drive system of claim 1, wherein said framework distributes at least the majority of actuator forces produced by said at least one linear actuator over multiple points that are spread apart on said top surface of said compartment floor of said load-holding compartment.

7. The conveyor drive system of claim 1, wherein said framework distributes all actuator forces produced by said at least one linear actuator over multiple points that are spread apart on said top surface of said compartment floor of said load-holding compartment.

\* \* \* \* \*